(12) United States Patent
Kim et al.

(10) Patent No.: US 12,443,028 B2
(45) Date of Patent: Oct. 14, 2025

(54) LIGHT MODULE

(71) Applicant: SEEGENE, INC., Seoul (KR)

(72) Inventors: Young Wook Kim, Seoul (KR); Jun Hyeok Jeong, Seoul (KR); Soon Joo Hwang, Seoul (KR); Hye Jin Lee, Anyang-si (KR); Dong Woo Kang, Seoul (KR)

(73) Assignee: SEEGENE, INC., Seoul (KR)

( * ) Notice: Subject to any disclaimer, the term of this patent is extended or adjusted under 35 U.S.C. 154(b) by 897 days.

(21) Appl. No.: 17/434,116

(22) PCT Filed: Feb. 27, 2020

(86) PCT No.: PCT/KR2020/002827
§ 371 (c)(1),
(2) Date: Aug. 26, 2021

(87) PCT Pub. No.: WO2020/175937
PCT Pub. Date: Sep. 3, 2020

(65) Prior Publication Data
US 2022/0137392 A1   May 5, 2022

(30) Foreign Application Priority Data

Feb. 27, 2019 (KR) .................. 10-2019-0023455
Aug. 30, 2019 (KR) .................. 10-2019-0107136

(51) Int. Cl.
*B01L 3/00* (2006.01)
*B01F 33/302* (2022.01)
(Continued)

(52) U.S. Cl.
CPC ....... *G02B 26/008* (2013.01); *G01N 21/6428* (2013.01); *G01N 21/6452* (2013.01);
(Continued)

(58) Field of Classification Search
CPC ............ G02B 26/008; G01N 21/6428; G01N 21/6452; G01N 2021/6439;
(Continued)

(56) References Cited

U.S. PATENT DOCUMENTS 4,683,195 A    7/1987  Mullis et al.
4,683,202 A    7/1987  Mullis
(Continued)

FOREIGN PATENT DOCUMENTS

JP    2018060175 A   4/2018
JP       6323227 B2   5/2018
(Continued)

OTHER PUBLICATIONS

Saiki et al., "Enzymatic Amplification of β-Globin Genomic Sequences and Restriction Site Analysis for Diagnosis of Sickle Cell Anemia", Science (1985), vol. 230, pp. 1350-1354.
(Continued)

*Primary Examiner* — Jennifer Wecker
*Assistant Examiner* — Oyeleye Alexander Alabi
(74) *Attorney, Agent, or Firm* — Harness, Dickey & Pierce, P.L.C.

(57) ABSTRACT

The present disclosure relates to a light module comprising a plurality of light sources emitting light to excite samples; a light source wheel accommodating the plurality of light sources; a plurality of filters filtering light emitted by the light sources; a filter wheel accommodating the plurality of filters; and a motor rotating the light source wheel and the filter wheel.

20 Claims, 17 Drawing Sheets

(51) Int. Cl.

| | |
|---|---|
| *B01F 33/3033* | (2022.01) |
| *B01L 7/00* | (2006.01) |
| *B01L 9/00* | (2006.01) |
| *B23D 63/00* | (2006.01) |
| *B29C 37/00* | (2006.01) |
| *B65G 47/80* | (2006.01) |
| *B82Y 15/00* | (2011.01) |
| *B82Y 20/00* | (2011.01) |
| *B82Y 30/00* | (2011.01) |
| *B82Y 40/00* | (2011.01) |
| *C12M 1/34* | (2006.01) |
| *C12M 3/06* | (2006.01) |
| *C12N 1/14* | (2006.01) |
| *C12N 1/20* | (2006.01) |
| *C12Q 1/02* | (2006.01) |
| *C12Q 1/6806* | (2018.01) |
| *C12Q 1/6844* | (2018.01) |
| *C12Q 1/6848* | (2018.01) |
| *C12Q 1/686* | (2018.01) |
| *C23C 2/00* | (2006.01) |
| *G01N 1/40* | (2006.01) |
| *G01N 15/10* | (2024.01) |
| *G01N 15/14* | (2024.01) |
| *G01N 15/1433* | (2024.01) |
| *G01N 21/29* | (2006.01) |
| *G01N 21/41* | (2006.01) |
| *G01N 21/45* | (2006.01) |
| *G01N 21/64* | (2006.01) |
| *G01N 21/65* | (2006.01) |
| *G01N 27/04* | (2006.01) |
| *G01N 27/12* | (2006.01) |
| *G01N 33/00* | (2006.01) |
| *G01N 33/543* | (2006.01) |
| *G01N 33/574* | (2006.01) |
| *G01N 33/58* | (2006.01) |
| *G02B 6/42* | (2006.01) |
| *G02B 26/00* | (2006.01) |

(52) U.S. Cl.
CPC ............ *G01N 2021/6439* (2013.01); *G01N 2021/6471* (2013.01)

(58) Field of Classification Search
CPC ....... G01N 2021/6471; G01N 21/6486; G01N 2021/6467; C12Q 1/686; C12Q 1/68; C12Q 2563/107
See application file for complete search history.

(56) References Cited

U.S. PATENT DOCUMENTS

| | | | |
|---|---|---|---|
| 4,800,159 A | 1/1989 | Mullis et al. | |
| 6,902,701 B1* | 6/2005 | Hughes | G01N 1/405 422/50 |
| 7,113,285 B2 | 9/2006 | Katzlinger et al. | |
| 7,928,408 B2 | 4/2011 | Ok et al. | |
| 8,262,252 B2 | 9/2012 | Bergman et al. | |
| 10,939,823 B2 | 3/2021 | Nakamura et al. | |
| 2003/0000538 A1* | 1/2003 | Bereman | A24B 15/246 131/310 |
| 2005/0036142 A1* | 2/2005 | Oldham | B82Y 20/00 356/417 |
| 2008/0248578 A1* | 10/2008 | Deans | G01N 21/643 422/68.1 |
| 2009/0068747 A1* | 3/2009 | Iten | G01J 3/0218 435/287.2 |
| 2011/0081724 A1* | 4/2011 | Swager | B82Y 15/00 977/773 |
| 2011/0089051 A1* | 4/2011 | Wang | B82Y 40/00 977/788 |
| 2012/0125547 A1* | 5/2012 | Akai | C08J 5/005 428/401 |
| 2016/0228876 A1 | 8/2016 | Chu et al. | |
| 2020/0209271 A1 | 7/2020 | Lee et al. | |

FOREIGN PATENT DOCUMENTS

| | | | |
|---|---|---|---|
| KR | 10-2006-0089104 A | 8/2006 | |
| KR | 10-2008-0036195 A | 4/2008 | |
| KR | 10-2008-0041617 A | 5/2008 | |
| KR | 10-2012-0086087 A | 8/2012 | |
| KR | 10-1414248 B1 | 7/2014 | |
| KR | 1020170057495 A | 5/2017 | |
| KR | 10-2017-0138993 A | 12/2017 | |

OTHER PUBLICATIONS

International Search Report and Written Opinion of the ISA issued in PCT/KR2020/002827, mailed Jun. 11, 2020; ISA/KR.
U.S. Appl. No. 17/439,881, filed Sep. 16, 2021, Young Wook Kim et al.
U.S. Appl. No. 17/439,900, filed Sep. 16, 2021, Jong Yoon Chun et al.
Extended European Search Report issued in corresponding European Application No. 20762228.3 dated Oct. 25, 2022, (7 Pages).
Office Action issued in corresponding Korean Patent Application No. 10-2021-7030444 dated Feb. 27, 2024, with English translation (24 Pages).
Notice of Allowance issued in corresponding Korean Patent Application No. 10-2021-7030444, dated Aug. 25, 2025.

* cited by examiner

LIGHT MODULE

CROSS-REFERENCE TO RELATED APPLICATIONS

This application is a U.S. National Phase Application under 35 U.S.C. 371 of International Application No. PCT/KR2020/002827, filed on Feb. 27, 2020, which claims the benefit of Korean Patent Application No. 10-2019-0023445, filed on Feb. 27, 2019 and Korean Patent Application No. 10-2019-0107136, filed on Aug. 30, 2019. The entire disclosures of the above applications are incorporated herein by reference.

TECHNICAL FIELD

The present disclosure relates to a light module.

BACKGROUND ART

A polynucleotide chain reaction (PCR), most widely used for nucleic acid amplification, includes repeated cycles of denaturation of double-stranded deoxyribonucleic acid (DNA), followed by oligonucleotide primer annealing to a DNA template and primer extension by a DNA polymerase (Mullis et al., U.S. Pat. Nos. 4,683,195, 4,683,202, and 4,800,159; and Saiki et al., (1985) Science 230, 1350-1354). The DNA denaturation is performed at about 95° C., and the annealing and primer extension are performed at a temperature lower than 95° C., i.e. a temperature ranging from 55° C. to 75° C.

The real-time PCR is a PCR-based technology for detecting a target nucleic acid in a sample in real time. To detect a specific target nucleic acid, a signal-generating means for generating an optical signal detectable in proportion to the amount of target nucleic acid in the PCR is used. Emission of the detectable optical signal may be performed by a method of using an intercalator that emits an optical signal when intercalated with double-stranded DNA or a method of using an oligonucleotide containing both an optical label (e.g. a fluorescence label) and a quencher molecule suppressing fluorescence emission of the optical label. An optical signal, the intensity of which is proportional to the amount of the target nucleic acid, is detected in every cycle. Intensities of optical signals detected in cycles are plotted, thereby obtaining an amplification curve or amplification profile curve.

In general, an optical label has a unique excitation wavelength range and a unique emission wavelength range. Two or more signal generators may be used to detect two or more targets in a single sample. The two or more signal generators emit fluorescent signals of different wavelengths corresponding to the presence of different targets. To detect a plurality of different optical labels in the sample, the sample must be sequentially irradiated by excitation light corresponding to the different optical labels. In this regard, a light module able to more efficiently apply excitation light to a plurality of samples including a plurality of different fluorescent substances is required.

In addition, in a conventional signal detection device, the number of filters is required to be the same as the number of detection channels detectable in a single sample. For example, a device for measuring a four channel-optical signal may use at least four optical filters in a single light module. In case of a signal detection device in which the number of filters and light sources that can be disposed on an optical part are limited due to the structure of an optical device, a sufficient number of channels may not be obtained using a conventional structure in which a single filter forms a single channel.

Accordingly, there is demand for the development of a novel light module able to overcome the above-described drawbacks and a signal detection device including the same.

DISCLOSURE OF INVENTION

Technical Problem

Accordingly, the present disclosure proposes a light module.

Solution to Problem

According to an aspect of the present disclosure, provided is a light module including: a plurality of light sources emitting light to excite samples; a light source wheel accommodating the plurality of light sources; a plurality of filters filtering light emitted by the light sources; a filter wheel accommodating the plurality of filters; and a motor rotating the light source wheel and the filter wheel.

According to an embodiment, the light source wheel may be divided into a plurality of light source areas, and one or more light sources may be disposed in each of the plurality of light source areas.

According to an embodiment, the light sources disposed in two or more light source areas from among the plurality of light source areas may emit light of different wavelengths.

According to an embodiment, the light sources disposed in different light source areas may emit light of different wavelengths.

According to an embodiment, positions of the plurality of light source areas may be synchronizedly changed by rotation of the light source wheel.

According to an embodiment, the light source areas may comprise a first light source area and a second light source area. Two or more first light sources emitting light of a first wavelength may be disposed in the first light source area. Two or more second light sources emitting light of a second wavelength may be disposed in the second light source area.

According to an embodiment, the filter wheel may be divided into a plurality of filter areas, and one or more filters are disposed in each of the filter areas.

According to an embodiment, positions of the plurality of filter areas may be synchronizedly changed by rotation of the filter wheel.

According to an embodiment, the light source wheel may be divided into a plurality of light source areas, the filter wheel may be divided into a plurality of filter areas, and the filter areas may be aligned so as to be located on a path of light emitted by the light source areas.

According to an embodiment, the light source wheel and the filter wheel may rotate so that the alignment of the light source areas and the filter areas is maintained.

According to an embodiment, the light source wheel and the filter wheel may be disposed in parallel to each other.

According to an embodiment, the light source wheel and the filter wheel may be configured to rotate together in response to rotation of the motor.

According to an embodiment, the light source wheel may be divided into a plurality of light source areas. The filter wheel may be divided into a plurality of filter areas. The light source disposed in a first light source area from among the plurality of light source areas may emit light of a first wavelength range. The light source disposed in a second light source area from among the plurality of light source areas may emit light of a second wavelength range. The filter disposed in a first filter area from among the plurality of filter areas may allow the light in the first wavelength range to pass therethrough. The filter disposed in a second filter area from among the plurality of filter areas may allow the light in the second wavelength range to pass therethrough. The first light source area and the first filter area may be located on a first path of light. The second light source area and the second filter area may be located on a second path of light.

According to an embodiment, the light source wheel may comprise n number of light source areas. The filter wheel may comprise n number of filter areas. The light source wheel and the filter wheel may be rotated 360°/n in a single time by the motor, where the n is a natural number equal to or greater than 2.

According to an embodiment, at least one light source area from among the plurality of light source areas may be a multi-wavelength light source area in which a first light source and a second light source are disposed. The first light source may emit light of a first wavelength range. The second light source may emit light of a second wavelength range different from the first wavelength range.

According to an embodiment, the first light source and the second light source may be arrayed regularly in a single light source area of the light source wheel.

According to an embodiment, the plurality of light source areas may comprise a single-wavelength light source area and a multi-wavelength light source area.

According to an embodiment, at least one filter area from among the plurality of filter areas may comprise a multi bandpass filter including a first passband and a second passband.

According to an embodiment, the first passband and the second passband may not overlap each other.

According to another aspect, provided is a device for detecting signals emitted by samples, the device comprising: a light module; a sample holder accommodating a plurality of reaction vessels; and a detection module detecting signals emitted from the samples included in the reaction vessels. The light module may comprise: a plurality of light sources emitting light to excite the samples; a light source wheel accommodating the plurality of light sources; a plurality of filters filtering light emitted by the light sources; a filter wheel accommodating the plurality of filters; and a motor rotating the light source wheel and the filter wheel.

According to an embodiment, the detection module may comprise a detector and a multi bandpass filter including a third passband and a fourth passband. The detector may be configured to detect the signals emitted from the sample. The multi bandpass filter may be configured such that the signals are radiated to the detector through the multi bandpass filter of the detection module.

According to an embodiment, the third passband may include a wavelength range of emission light emitted by an optical label excitable by excitation light passing through the first passband of the multi bandpass filter. The fourth passband may include a wavelength range of emission light emitted by an optical label excitable by excitation light passing through the second passband of the multi bandpass filter.

Advantageous Effects of Invention

The present disclosure provides a light module in which a light source wheel and a filter wheel rotate together.

According to the present disclosure, a light source emitting light of a specific wavelength and a filter allowing the light in the specific wavelength to pass therethrough are disposed on a single path. Therefore, it is possible to provide filtered excitation light to samples.

According to the present disclosure, both the light source wheel and the filter wheel may be rotated using a single motor.

According to embodiments of the present disclosure, a signal detection device may excite two or more optical labels using a multi-wavelength light source unit and a multi bandpass filter without the replacement of the filter.

According to embodiments of the present disclosure, the signal detection device may generate more types of excitation light than the number of light source areas included in the light module. Thus, a sufficient number of detectable optical labels may be obtained even in the case in which the signal detection device is designed to have a limited number of mountable light source units.

A conventional signal detection device having a multi-detection channel uses white light produced by a combination of wavelengths over a substantially full range of the visible spectrum as a light source, and a filter for transmitting a light of specific wavelength range that can excite a specific optical label. In this case, light of most wavelength range of the white light is blocked except for a light of specific wavelength range that can excite a specific optical label, and the intensity of light irradiated to the optical label is greatly reduced compared to the total intensity of light produced from the light source before filtering.

Since the light module and the signal detection device according to embodiments of the present disclosure use light source elements generating light of a specific wavelength, significantly higher performance compared to that of light source elements generating white light may be obtained when the same intensity of light is generated.

BRIEF DESCRIPTION OF DRAWINGS

FIGS. 4A to 9 are views illustrating the light source wheel and the filter wheel divided into a plurality of areas;

FIGS. 15A to 15D illustrate the light module according to an embodiment, in which FIG. 15A illustrates a light source wheel comprising a plurality of light source areas configured to accommodate light sources, FIG. 15B illustrates a configuration of the light source wheel to which the light sources are coupled, FIG. 15C illustrates an assembly of the light source wheel and the motor serving as a light module moving means, and FIG. 15D illustrates a filter wheel of an embodiment attachable to the light source wheel and a plurality of bandpass filters accommodated in the filter wheel;

MODE FOR THE INVENTION

Figure 1:
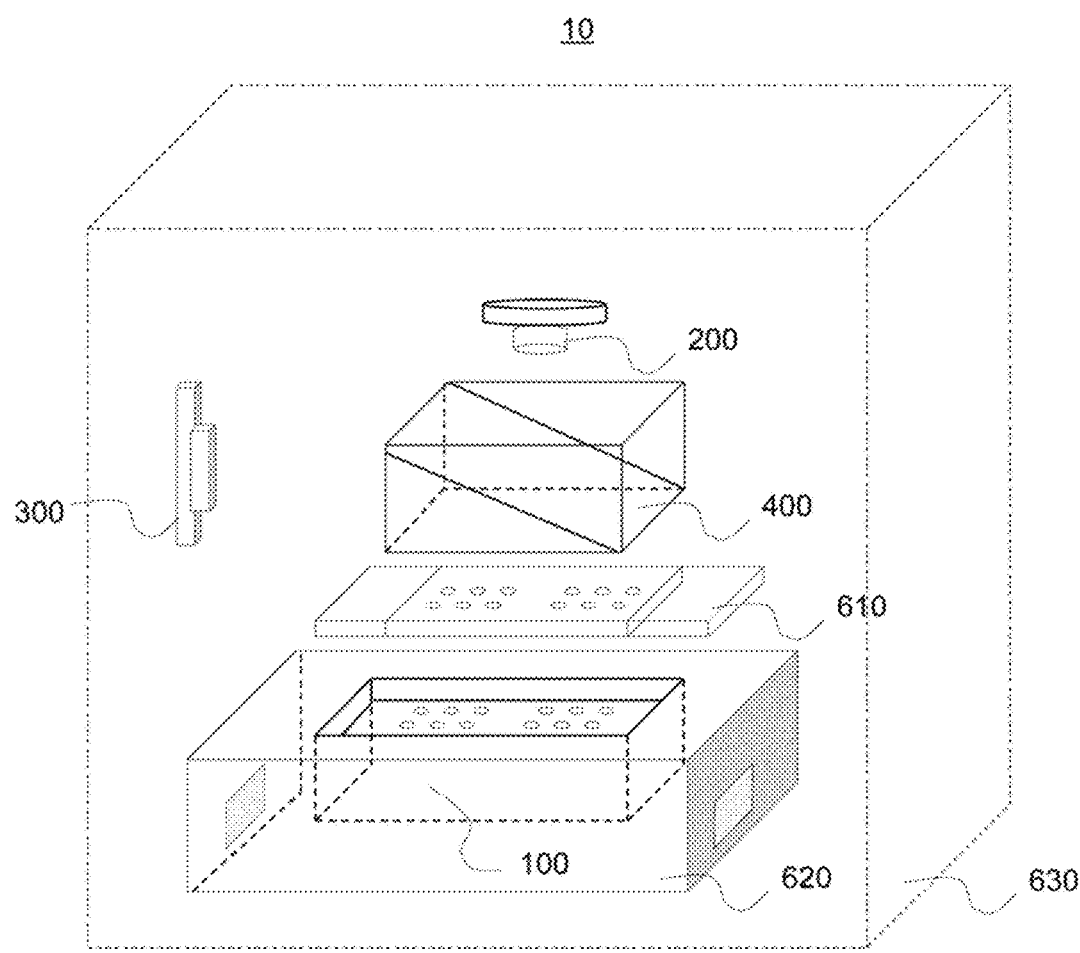
FIG. 1 is a view illustrating a signal detection device.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted in the situation in which the subject matter of the present disclosure may be rendered rather unclear thereby.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

I. Light Module and Signal Detection Device in which Light Source and Filter are Rotatable FIG. 1 is a view illustrating a signal detection device 10. Referring to FIG. 1, the signal detection device 10 comprises a light module 200, a sample holder 100, and a detection module 300. The signal detection device 10 may comprise the light module 200, a beam splitter 400, a pressure lead 610, the sample holder 100, a sample holder housing 620, the detection module 300, and a container 630.

The light module 200 emits light to excite a fluorescent substance contained in a sample. The light module 200 includes a plurality of light sources 215. Light emitted by the light sources 215 may be indicated as excitation light. Light emitted from the sample may be indicated as emission light. A path of excitation light emitted by each of the light sources 215 may be indicated as an excitation path. A path of emission light emitted from the sample may be indicated as an emission path. For example, the respective light sources 215 may be a light-emitting diode (LED), such as an organic LED, an inorganic LED, or a quantum dot LED, or a laser unit, such as a tunable laser, a He—Ne laser, or an Ar laser. According to an implementation of the present disclosure, the light source may be an LED. Specifically, the light source of the present disclosure may be an LED generating light of a specific wavelength range.

The beam splitter 400 reflects light incident from the light module 200 or allows the light to pass therethrough. The light that has passed the beam splitter 400 arrives at the sample holder 100 through a hole in the pressure lead 610. In addition, the beam splitter 400 reflects light incident from the sample or allows the light to pass therethrough. The light reflected by the beam splitter 400 arrives at the detection module 300.

The pressure lead 610 provides pressure to reaction vessels held in the sample holder 100. The pressure lead 610 may contact the covers of the reaction vessels and press the covers of the reaction vessels, thereby providing pressure to the reaction vessels. In addition, the pressure lead 610 may maintain a high temperature. For example, the pressure lead 610 may comprise a heat plate (not shown) to maintain a temperature of 105° C.

The pressure lead 610 comprises a plurality of holes. The holes of the pressure lead 610 are provided in positions corresponding to the holes of the sample holder 100.

The sample holder 100 accommodates the reaction vessels. The sample holder 100 may comprise the plurality of holes, in which the reaction vessels may be positioned. The reaction vessels may include samples, respectively, from which fluorescence is emitted. The sample holder 100 may be a thermal conductive material. When the sample holder 100 contacts the reaction vessels, heat may be transmitted from the sample holder 100 to the reaction vessels. For example, the sample holder 100 may be made of a metal, such as Al, Au, Ag, Ni, or Cu. As an alternative, a separate component may be used in place of the sample holder to directly supply energy to the reaction vessels to adjust the temperature of the samples in the reaction vessels. In this case, the sample holder 100 may be configured so as not to transmit heat to the reaction vessels while accommodating the reaction vessels.

An example of the sample holder 100 is a thermal block. The thermal block may comprise a plurality of holes, in which the reaction vessels may be located.

Another example of the sample holder 100 is a heating plate. The heating plate is provided by attaching a thin metal portion to a plate on which a sample is accommodated. The heating plate may be operated, or heated, by flowing current through the thin metal portion.

Another example of the sample holder 100 is a receptacle able to accommodate one or more chips or cartridges. An example of the cartridge is a fluid cartridge including a flow channel.

The sample holder housing 620 may comprise the sample holder 100, a heat transfer element (not shown), a heat sink plate (not shown), and the like. The heat transfer element serves to increase or decrease the temperature of the sample holder 100. The heat transfer element may be disposed below the sample holder 100 to be in contact with the sample holder 100, thereby transferring heat to the sample holder 100. In an example, the heat transfer element may be a Peltier element. The heat sink plate is disposed below the heat transfer element to dissipate heat generated by the heat transfer element.

The detection module 300 detects signals. Specifically, the detection module 300 comprises detectors 310, and detects fluorescence generated by the samples. The respective detectors 310 may be a charge coupled device (CCD), a complementary metal oxide semiconductor (CMOS) field effect transistor, a photodiode, or the like.

The signal detection device is a device detecting signals generated by the samples. According to an implementation of the present disclosure, such signals may indicate the presence of a target analyte, more particularly, the presence of a target nucleic acid. Thus, the device according to the present disclosure may be a target nucleic acid detection device.

Figure 2:
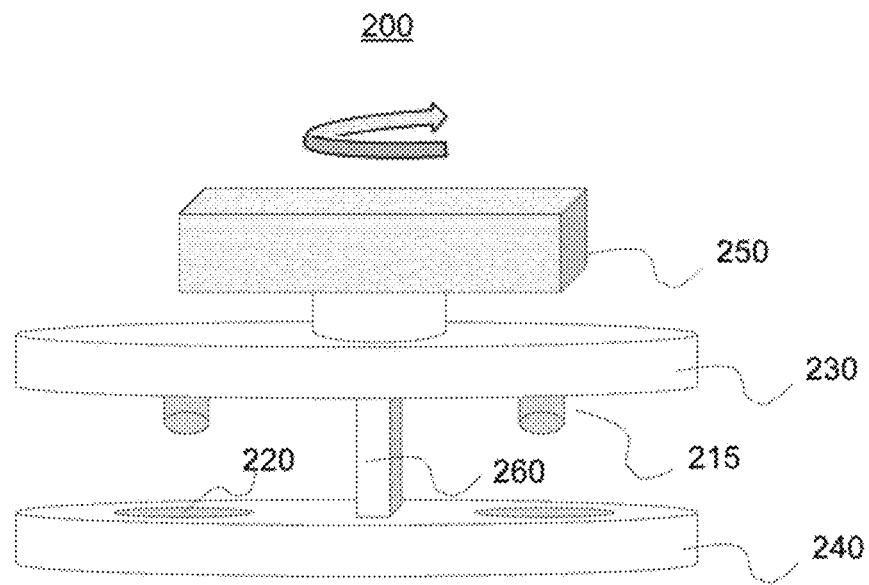
FIGS. 2 and 3 are views illustrating a light module according to an embodiment.
Figure 3:
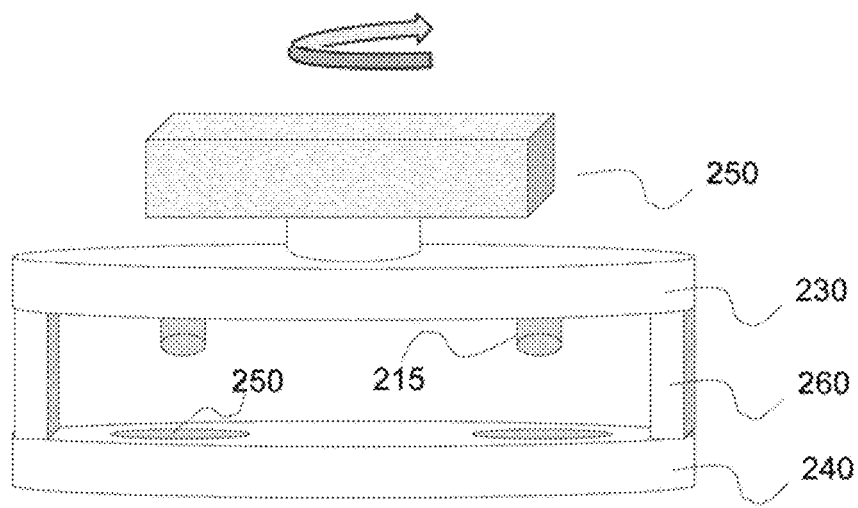
Figure 4:
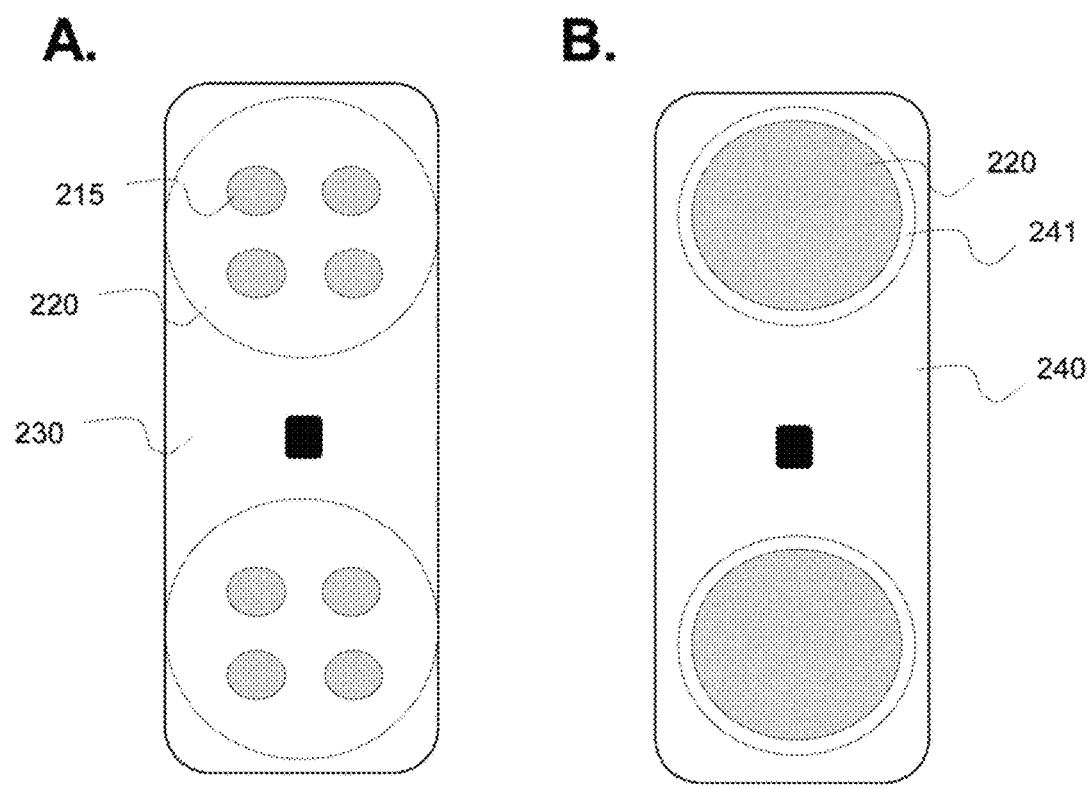

FIGS. 2 and 3 are views illustrating the light module 200 according to an embodiment. The light module 200 comprises a motor 250, a light source wheel 230, and a filter wheel 240.

The light module 200 may further comprise a connecting structure (or connecting structures) 260. The connecting structure 260 connects the light source wheel 230 and the filter wheel 240. The light module 200 illustrated in FIG. 2 is configured such that the connecting structure 260 connects the central portions of the light source wheel 230 and the filter wheel 240, while the light module 200 illustrated in FIG. 3 is configured such that the connecting structures 260 connect the peripheral portions of the light source wheel 230 and the filter wheel 240. Although FIGS. 2 and 3 illustrate an example in which the respective connecting structures 260 are rectangular parallelepipeds, the connecting structure 260 may have a variety of shapes, such as a plate or a cylinder. For example, the connecting structure 260 may be shaped to surround the light source wheel 230 and the filter wheel 240.

The light sources 215 emit light to excite the samples. The light sources 215 emit light of the same wavelength or different wavelengths. Here, wavelength includes not only a specific wavelength but also a wavelength range. For example, the wavelength may indicate a specific wavelength of 400 nm or a wavelength range of from 390 nm to 410 nm.

The light source wheel 230 accommodates the plurality of light sources 215. The light source wheel 230 accommodates two or more light sources 215. The light source wheel 230 accommodating the plurality of light sources 215 may mean that the plurality of light sources 215 are attached to the light source wheel 230. In addition, the light source wheel 230 accommodating the plurality of light sources 215 may mean that the plurality of light sources 215 are fixed to specific positions of the light source wheel 230. The light sources 215 may be attached to one end surface of the light source wheel 230. For example, the light sources 215 may be attached to the bottom end surface of the light source wheel 230. The bottom end surface of the light source wheel 230 means one end surface facing the filter wheel 240. The top end surface of the light source wheel 230 means one end surface facing the motor 250.

Differently from FIGS. 2 and 3, the motor 250 may be located on the far left, the light source wheel 230 may be located to the left of the motor 250, and the filter wheel 240 may be located to the right of the light source wheel 230.

Although FIGS. 2 and 3 illustrate the light source wheel 230 accommodating two light sources 215, the light source wheel 230 may accommodate three or more light sources 215.

The light source wheel 230 may be rotated by the motor 250, and the shape of the light source wheel 230 may be a circle, an ellipse, a rectangle, a square, or the like.

The positions of the plurality of light sources 215 may be synchronizedly changed by the rotation of the light source wheel 230. For example, in a case in which the light source wheel 230 includes three light sources 215, when the light source wheel 230 rotates, a first light source 215 may move to the position of a second light source 215, the second light source 215 may move to the position of a third light source 215, and the third light source 215 may move to the position of the first light source 215.

The filter wheel 240 accommodates a plurality of filters 220. The filter wheel 240 accommodating the plurality of filters 220 may mean that the plurality of filters 220 are included in the filter wheel 240. In addition, the filter wheel 240 accommodating the plurality of filters 220 may mean that the plurality of filters 220 are fixed in specific positions of the filter wheel 240. The filter wheel 240 may be rotated, and may have a shape, such as a circle, an ellipse, a rectangle, or a square. Although the respective filters 220 are also illustrated as being a circle, the shape of the filter 220 may a circle, an ellipse, a rectangle, a square, or the like.

The position of the plurality of filters 220 may be synchronizedly changed by the rotation of the filter wheel 240. For example, in a case in which the filter wheel 240 includes three filters 220, when the filter wheel 240 rotates, a first filter may move to the position of a second filter, the second filter may move to the position of a third filter, and the third filter may move to the position of the first filter.

The respective filters 220 filter light emitted by the light sources 215. The filter 220 filtering light may mean that the filter 220 allows a portion of incident light to pass therethrough but blocks the remaining portion of the incident light. For example, in a case in which the respective filters 220 are a bandpass filter, the filter 220 allows light of a wavelength included in a band to pass therethrough but blocks light of a wavelength not included in the band.

As illustrated in FIG. 2 or 3, the light source wheel 230 and the filter wheel 240 may be disposed in parallel to each other. Accordingly, the direction of rotation of the motor 250 is the same as the direction of rotation of the filter wheel 240 and the direction of rotation of the filter wheel 240.

Since the light source wheel 230 and the filter wheel 240 are fixed to each other by the connecting structure 260, the light source wheel 230 and the filter wheel 240 are rotated by the rotation of the motor 250. FIG. 2 illustrates an example in which the connecting structure 260 connects the center of the light source wheel 230 and the center of the filter wheel 240. Differently from FIGS. 2 and 3, the connecting structure 260 may connect other portions of the light source wheel 230 and the filter wheel 240.

Each of the light source wheel 230 and the filter wheel 240 may be a plate, and the light source wheel 230 may be thinner than the filter wheel 240. Since the light sources 215 are attached to the light source wheel 230, it is not necessary for the light source wheel 230 to be thick. However, since the filters 220 are located inside of the filter wheel 240, the filter wheel 240 may be thicker than the light source wheel 230.

The light sources 215 may be attached to the bottom end surface of the light source wheel 230. The filters 220 may be disposed between the top end and the bottom end of the filter wheel 240, in parallel to the filter wheel 240.

The light sources 215 and the filters 220 correspond to each other. The light sources 215 and the filters 220 corresponding to each other may mean that the light sources 215 and the filters 220 are disposed in positions corresponding to each other or the characteristics of the light sources 215 and the characteristics of the filters 220 correspond to each other. The light sources 215 and the filters 220 being disposed in the corresponding positions may mean that the light sources 215 and the filters 220 are disposed such that light emitted by the light sources 215 passes through the filters 220. The corresponding characteristics of the light sources 215 and the filters 220 may mean that the characteristics of the light sources 215 and the characteristics of the filters 220 are determined such that light emitted by the light sources 215 passes through the filters 220. Accordingly, the characteristics of the filters 220 are determined depending on the characteristics of the light sources 215, and the filters 220 are disposed on light paths of the light sources 215. For example, in a case in which the first light source 215 emitting light of a first wavelength is disposed on the light source wheel 230, the first filter 220 allowing the first wavelength light to pass therethrough is disposed on the path of the light emitted by the first light source 215.

FIGS. 4A to 9 are views illustrating the light source wheel 230 and the filter wheel 240 divided into a plurality of areas.

FIG. 4A illustrates the light source wheel 230 divided into two light source areas 210. Although FIG. 4A illustrates an example in which four light sources 215 are disposed in a single light source area 210, one or more light sources 215 may be disposed in a single light source area 210. According to an implementation, in a case in which a plurality of light sources are disposed in a single light source area 210, the light sources are symmetrically disposed, in particular, to be point symmetric. According to an implementation, in a case in which a plurality of light sources 215 are disposed in a single light source area 210, the plurality of light sources 215 are disposed radially.

In FIG. 4A, in a case in which the light source wheel 230 includes two light source areas 210, the light source wheel 230 may have a rectangular shape. Although the respective light source areas 210 are illustrated as being a circle in FIG. 4A, the light source areas 210 may not be marked on the light source wheel 230. The light source areas 210 means areas respectively indicating a group of light sources 215.

FIG. 4B illustrates the filter wheel 240 including two filter areas 241. Although FIG. 4B illustrates an example in which a single filter 220 is disposed in a single filter area 241, one or more filters 220 may be disposed in a single filter area 241. Although the filter wheel 240 in FIG. 4B is illustrated as having the same shape as the light source wheel 230 in FIG. 4A, the shape of the filter wheel 240 may be different from the shape of the light source wheel 230. Even in the case in which the shape of the filter wheel 240 is different from the shape of the light source wheel 230, the position, size, number, and the like of the filters 220 are determined on the basis of the position, size, number, and the like of the light source areas 210.

Figure 5:
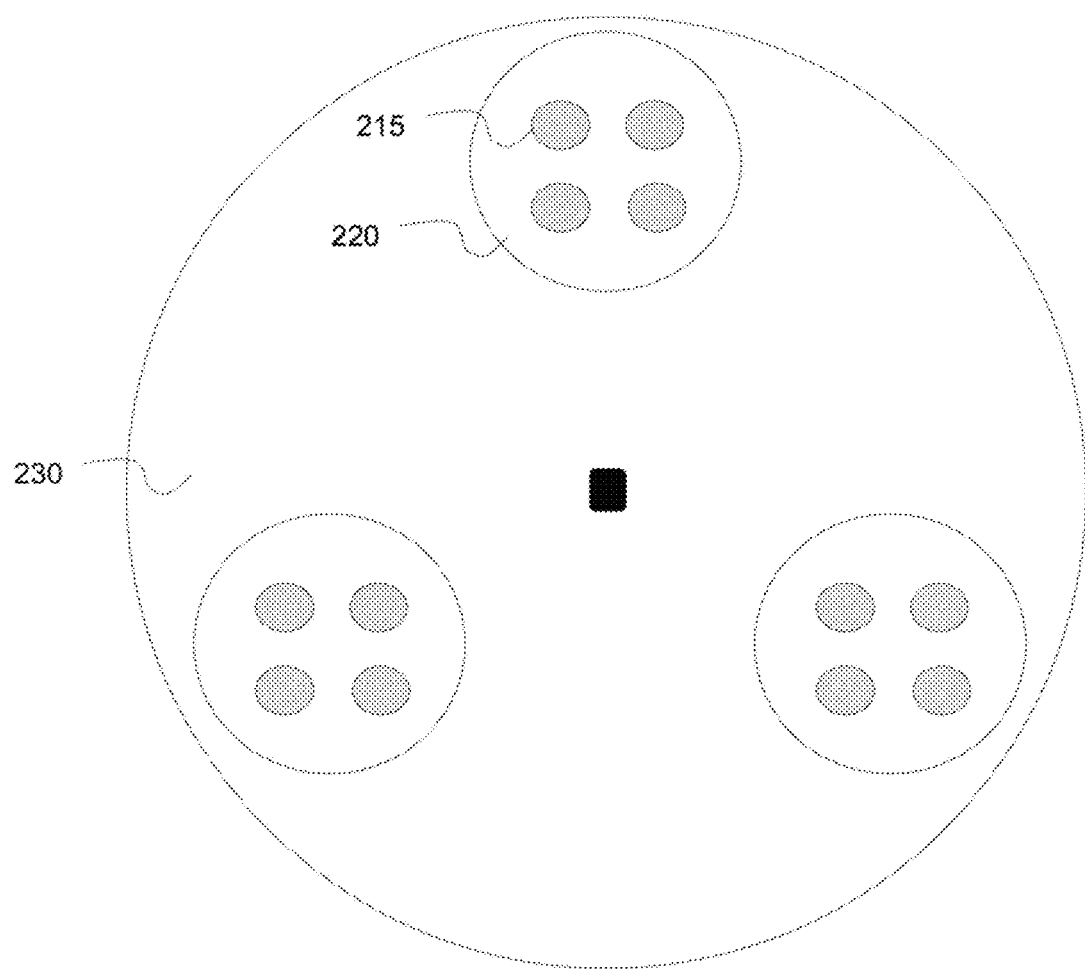
Figure 6:
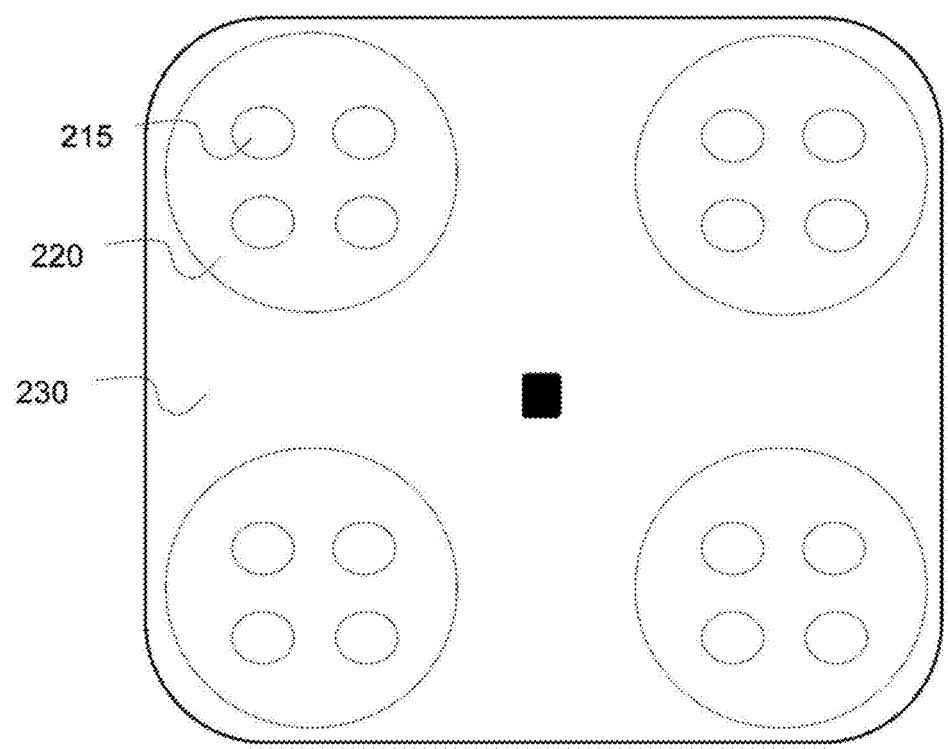
Figure 7:
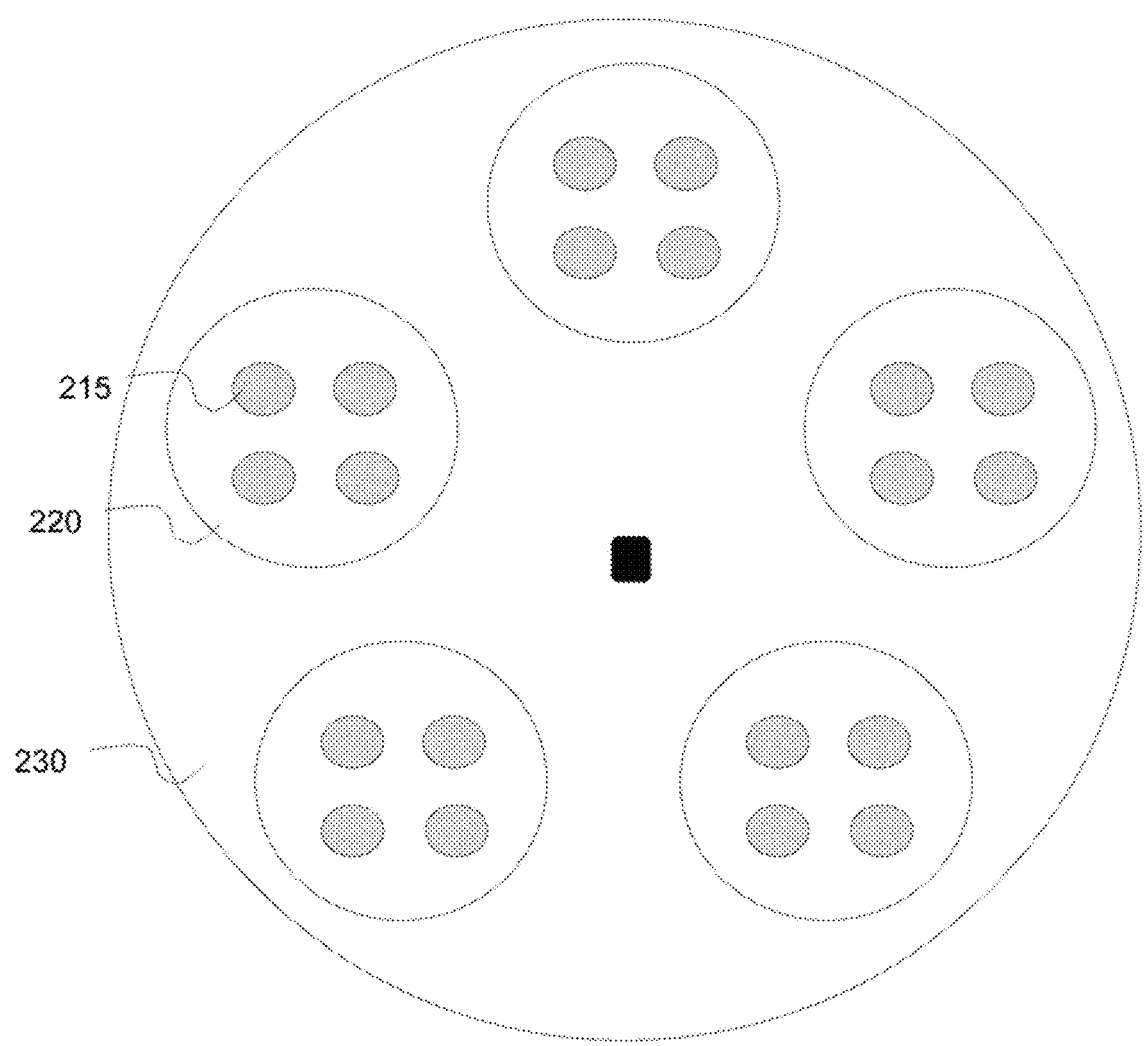

The light source wheel 230 divided into the plurality of light source areas 210, and one or more light sources 215 are disposed in each of the light source areas 210. FIG. 5 illustrates the light source wheel 230 including three light source areas 210, FIG. 6 illustrates the light source wheel 230 including four light source areas 210, and FIG. 7 illustrates the light source wheel 230 divided into five light source areas 210.

Figure 8:
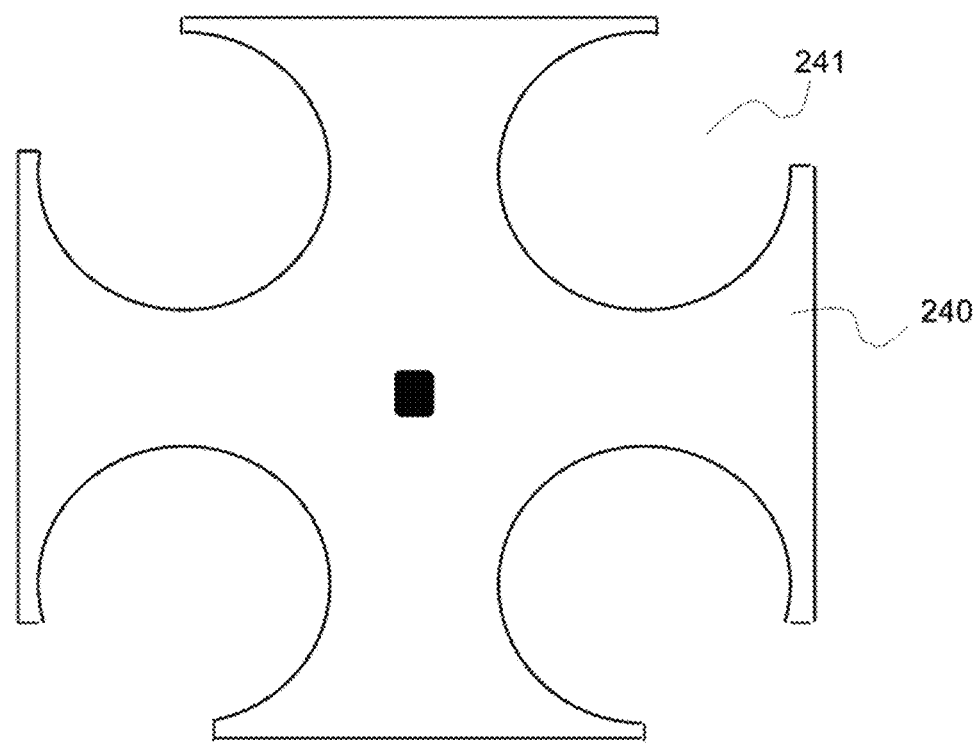
Figure 9:
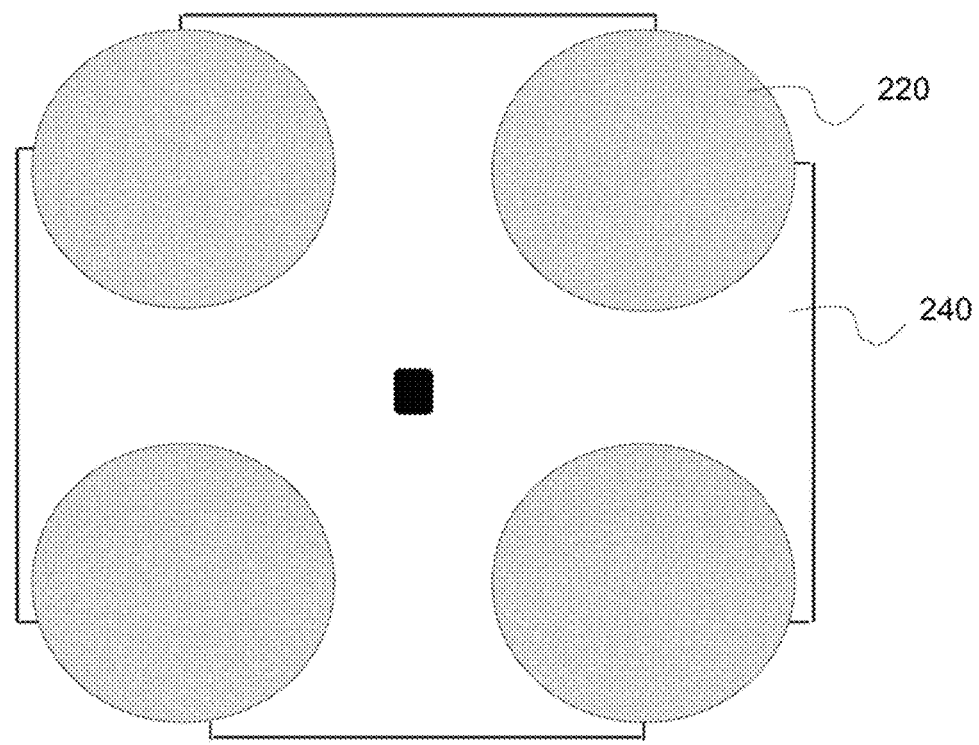

The filter wheel 240 divided into the plurality of filter areas 241, and one or more filters 220 are disposed in each of the filter areas 241. FIGS. 8 and 9 illustrate the filter wheel 240 divided into four filter areas 241.

The light sources 215 disposed in a single light source area 210 may emit light of the same wavelength. For example, in a case in which the upper light source area 210 is a first light source area and the lower light source area 210 is a second light source area in FIG. 4A, the four light sources disposed in the first light source area may emit light of a first wavelength and the four light sources disposed in the second light source area may emit light of a second wavelength.

As an alternative, the light sources 215 emitting light of different wavelengths may be disposed in a single light source area 210. Such a light source area is referred to as a multi-wavelength light source area. A light module to which the multi-wavelength light source area is applied and a device using the same will be described separately later.

The filter wheel 240 is divided into the plurality of filter areas 241, and one or more filters 220 are disposed in each of the filter areas 241. FIG. 4B illustrates an example in which a single filter 220 is disposed in a single filter area 241. The filter wheel 240 may include the filter areas 241 defined in the shape of insertion holes, and the filters may be inserted into the insertion holes, respectively.

Although the light source areas 210 and the filter areas 241 are illustrated in FIGS. 4A, 4B, and 9 for a better understanding of the description, the light source areas 210 and the filter areas 241 may indicate areas in which the light sources 215 or the filters 220 are disposed and may not be divided into separate structures.

According to the present disclosure, the light source wheel 230 and the filter wheel 240 have structures that may be separated from each other. The light source wheel 230 may be separated from the filter wheel 240 while the light sources remain fixed to the light source wheel 230. The filter wheel 240 may be separated from the light source wheel 230 while the filters 220 remain fixed to the filter wheel 240.

This structure may facilitate the management of the light source wheel 230 and filter wheel 240 and may facilitate the assembly of the light module.

The light sources 215 disposed in two or more light source areas 210 among the plurality of light source areas 210 may emit light of different wavelengths. For example, in a case in which the light source wheel 230 comprises two light source areas 210, the light sources 215 disposed in one of the light source areas 210 may emit light of different wavelengths from the light sources 215 disposed in the remaining light source area 210. For example, in a case in which the light source wheel 230 comprises three light source areas 210, the light sources 215 disposed in one of the light source areas 210 may emit light of different wavelengths from the light sources 215 disposed in the remaining light source areas 210, or the light sources 215 disposed in the two light source areas 210 may emit light of the same wavelength while the light sources 215 disposed in the remaining light source area 210 may emit light of different wavelengths.

The positions of the light source areas 210 are synchronizedly changed by the rotation of the light source wheel 230. That is, the positions of the light source areas 210 are rotated by the rotation of the light source wheel 230. For example, in a case in which the light source wheel 230 comprises two light source areas 210, a first light source area and a second light source area may exchange the positions thereof. In a case in which the light source wheel 230 comprises three light source areas 210, the rotation of the motor 250 causes a first light source area to move to the position of a second light source area, the second light source area to move to the position of a third light source area, and the third light source area to move to the position of the first light source area. Such movement in the position according to the present disclosure may be referred to as "rotational movement."

According to an embodiment, the light source wheel 230 comprises the first light source area and the second light source area. Two or more first light sources emitting light of a first wavelength are disposed in the first light source area. Two or more second light sources emitting light of a second wavelength are disposed in the second light source area.

According to another embodiment, in a case in which the light source wheel 230 comprises n number of light source areas 210, the light source wheel 230 and the filter wheel 240 are rotated 360°/n in a single time by the motor 250, where n is a natural number equal to or greater than 2. According to an embodiment, in a case in which the light source wheel 230 comprises two light source areas 210 and the filter wheel 240 includes two filter areas 241, the light source wheel 230 and the filter wheel 240 are rotated 180° in a single time by the motor 250.

According to another embodiment, in a case in which the light source wheel 230 comprises three light source areas 210 and the filter wheel 240 comprises three filter areas 241, the light source wheel 230 and the filter wheel 240 are rotated 120° in a single time by the motor 250.

According to another embodiment, in a case in which the light source wheel 230 comprises four light source areas 210 and the filter wheel 240 comprises four filter areas 241, the light source wheel 230 and the filter wheel 240 are rotated 90° in a single time by the motor 250.

The light source wheel 230 and the filter wheel 240 may have light source areas and filter areas corresponding to each other, and are put together such that the corresponding areas may be aligned. The filter areas 241 are aligned so as to be located on a path of light emitted by the light source areas 210. More specifically, the filters 220 accommodated in the filter areas 241 are located on the path of light emitted by the light sources 215 accommodated in the light source areas 210. The light source wheel 230 and the filter wheel 240 rotate so that the alignment of the light source areas 210 and the filter areas 241 is maintained. In a case in which the light source wheel 230 and the filter wheel 240 are fixed by the connecting structure 260, the alignment of the light source wheel 230 and the filter wheel 240 may be maintained even when the light source wheel 230 and the filter wheel 240 are rotated.

For example, the connecting structure 260 may connect the light source area 210 and the filter area 241. In a case in which the light module 200 includes four light source areas 210 and four filter areas 241, the light module 200 may include four connecting structures. Each of the connecting structures 260 may be a cylinder connecting the peripheries of the light source area 210 and the filter area 241. Light emitted by the light sources 215 of the light source area 210 may arrive at the filter 220 through the inside of the connecting structure 260.

FIGS. 8 and 9 are front views illustrating the filter wheel 240 according to an embodiment. FIG. 8 illustrates the filter wheel 240 including four filter areas 241, in which no filters 220 are disposed. FIG. 9 illustrates a case in which the filters 220 are located on the filter wheel 240.

In a case in which no filters 220 are provided, the filter areas 241 are left as hollow spaces. Since the light source areas 210 indicate positions to which the light sources 215 are attached, the light source areas 210 are not hollow spaces even in the case in which no light sources 215 are provided. However, the filter areas 241 without the filters 220 are hollow spaces.

The filter wheel 240 may have the shape of a triangle, a quadrangle, a pentagon, or the like, while the filter area 241 may have the shape of a circle, an ellipse, a triangle, a quadrangle, a pentagon, or the like. The filter wheel 240 may have a shape as illustrated in FIG. 8, in which the corners thereof are cut off. In the light source wheel 230, unnecessary corners thereof may be cut off.

Figure 10:
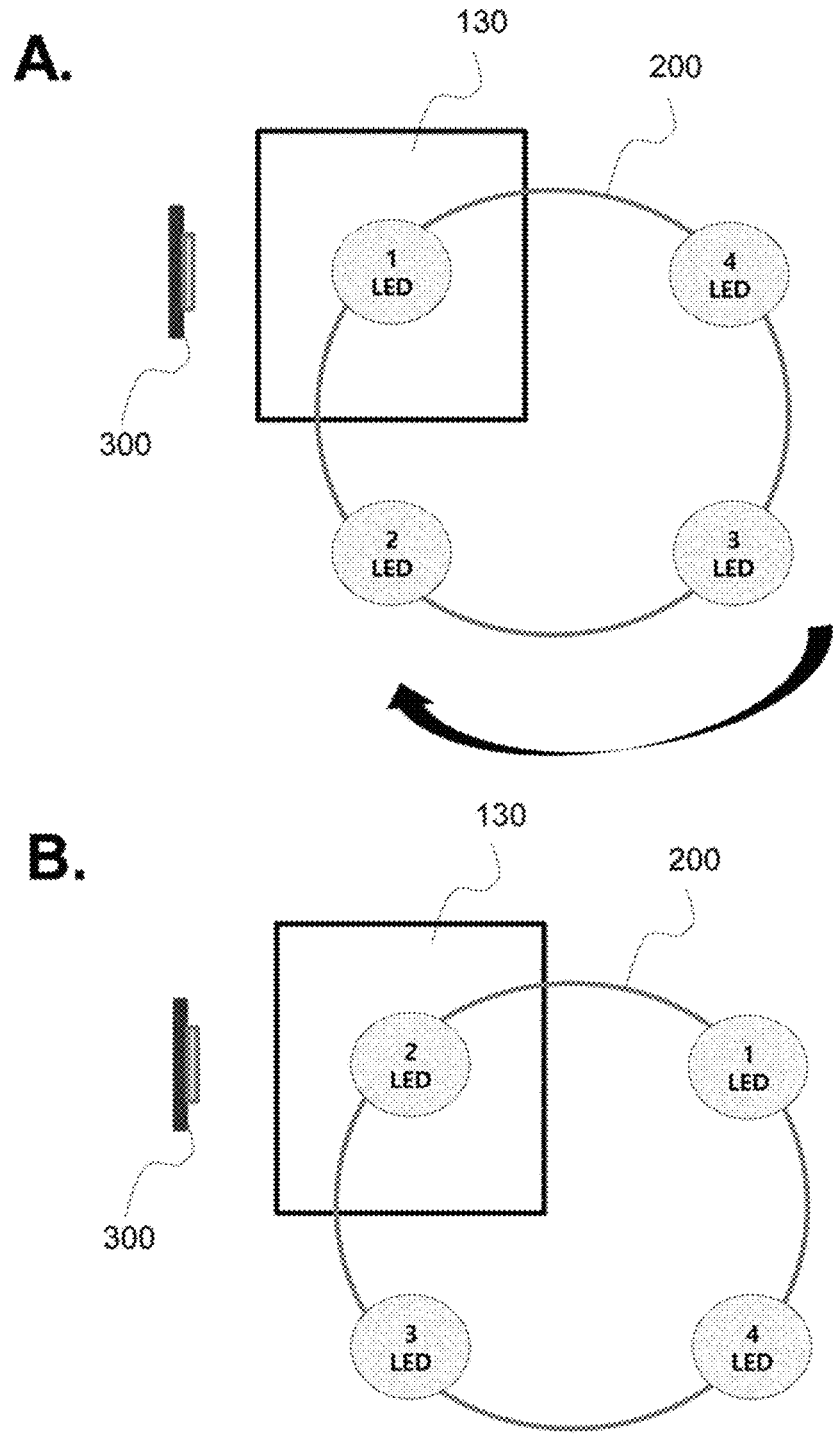
FIGS. 10A and 10B are views illustrating a method of detecting fluorescence using the light module.

FIGS. 10A and 10B are views illustrating a method of detecting fluorescence using the light module 200. FIGS. 10A and 10B illustrate a case in which the light module 200 emitting light to a sample area 130 and a detector 60 detects light emitted from the sample area 130. For the sake of brevity, the beam splitter 400 is omitted, and the light module 200 is briefly illustrated as including four LEDs (light sources).

FIGS. 10A and 10B are plan views of the signal detection device 10.

The light module 200 rotates and emits light to the sample area 130. Light is emitted from the sample area 130 and then is reflected by the beam splitter 400 to arrive at the detector 60. The direction in which the light module 200 rotates may be perpendicular to the direction of the light emitted by the light module 200.

FIG. 10A illustrates the first LED emitting light to the sample area 130, while FIG. 10B illustrates the second LED emitting light to the sample area 130. In FIGS. 10A and 10B, the beam splitter 400, the pressure lead 610, and the like are omitted. The beam splitter 400 and the pressure lead 610 may be located between the sample area 130 and the light module 200.

FIG. 10B illustrates a case in which the light module 200 in FIG. 10A has been rotated by 90°. In response to the rotation of the light module 200 by 90°, the positions of the LEDs are synchronizedly changed. That is, the first LED moves to the position of the fourth LED, the fourth LED moves to the position of the third LED, the third LED moves to the position of the second LED, and the second LED moves to the position of the first LED.

Through this process of rotational movement, the first to fourth LEDs sequentially emit light to the sample area 130. When the first LED emits light to the sample area 130, the light arrives at the plurality of samples located in the sample area 130. A fluorescent substance contained in the respective samples emits fluorescence, and the detection module 300 detects the fluorescence emitted by the first LED. When the detection of the fluorescence emitted by the first LED is completed, the light module 200 is rotated by 90°, and the second LED is located in the sample area 130. When the detection of the fluorescence emitted by the second LED is completed, the light module 200 is rotated by 90°, and the third LED is located in the sample area 130. When the detection of the fluorescence emitted by the third LED is completed, the light module 200 is rotated by 90°, and the fourth LED is located in the sample area 130. Through the above-described processes, the light module 200 may emit light of four wavelengths to a single sample area 130.

According to an implementation, the light module 200 may be disposed above the sample area 130. In particular, the light source wheel 230 and the filter wheel 240 of the light module 200 may be disposed horizontally to the sample area 130. The light emitted by the light module 200 may be incident perpendicularly to the sample area 130.

According to an implementation, the light source wheel 230 and the filter wheel 240 of the light module 200 may be disposed at a predetermined angle (e.g. 90°) to the sample area 130. In this case, the path of an excited beam may be adjusted using the beam splitter 400 or the like.

According to an implementation, the sample holder may include a plurality of wells, each of which may accommodate a reaction vessel, and a single light source area may emit light simultaneously to the plurality of wells. For example, light may be emitted simultaneously to a plurality of wells, such as 10 or more wells, 16 or more wells, 20 or more wells, 32 or more wells, or 40 or more wells.

The detection module 300 detects fluorescence emitted from samples included in the plurality of reaction vessels.

The reaction vessels are located in the sample area 130. The fluorescent substance is excited by the light module 200, so that fluorescence is emitted from the fluorescent substance. The fluorescence may be received by the detection module 300 through the beam splitter 400. In a case in which the detection module 300 is located on a straight path along which emission light is emitted to the sample area 130, the fluorescence may be received without the use of the beam splitter 400 or the like.

The detection module 300 detects the fluorescence by generating an electrical signal depending on the intensity of the fluorescence.

The detection module 300 is disposed in a fixed position. Although the light module 200 rotates, the detection module 300 does not rotate. The detection module 300 may be disposed at a distance at which the fluorescence generated by the sample area 130 is covered.

The detection module 300 may be one or more detection modules. The detection module 300 may include detection filters 320 to filter incident fluorescence. The detection filters 320 may be disposed in front of the detectors 310. The filters disposed in front of the detectors 310 may vary depending on the wavelength range to be detected.

II. Light Module and Signal Detection Device Using Multi-Wavelength Light Source Area and Multi Bandpass Filter Light sources disposed in a single light source area may emit light of the same wavelength range. Such a light source area is referred to as a single-wavelength light source area. In addition, light sources disposed in a single light source area may emit light of two or more wavelength ranges. Such a light source area is referred to as a multi-wavelength light source area.

According to an implementation the present disclosure, the light module may comprise a multi-wavelength light source area. According to an implementation the present disclosure, one or more light source areas among the plurality of light source areas may be multi-wavelength light source areas in each of which a first light source emitting light of a first wavelength range and a second light source emitting light of a second wavelength range different from the first wavelength range are disposed.

The single-wavelength light source area is a light source area that generates excitation light of a single specific wavelength range, while the multi-wavelength light source area is a light source area that generates excitation light of two or more different wavelength ranges. The multi-wavelength light source area may selectively generate excitation light of two or more different specific wavelength ranges, thereby selectively exciting an intended optical label from among two or more different optical labels (e.g. a fluorescence labels) that may be included in the samples.

The light source area may include one or more light sources that may be arrayed regularly. Accordingly, the above-described light source area may uniformly radiate light to the area of an intended sample holder.

According to an implementation the present disclosure, the first light source and the second light source may be arrayed regularly in a single light source area of the light source wheel.

Figure 12:
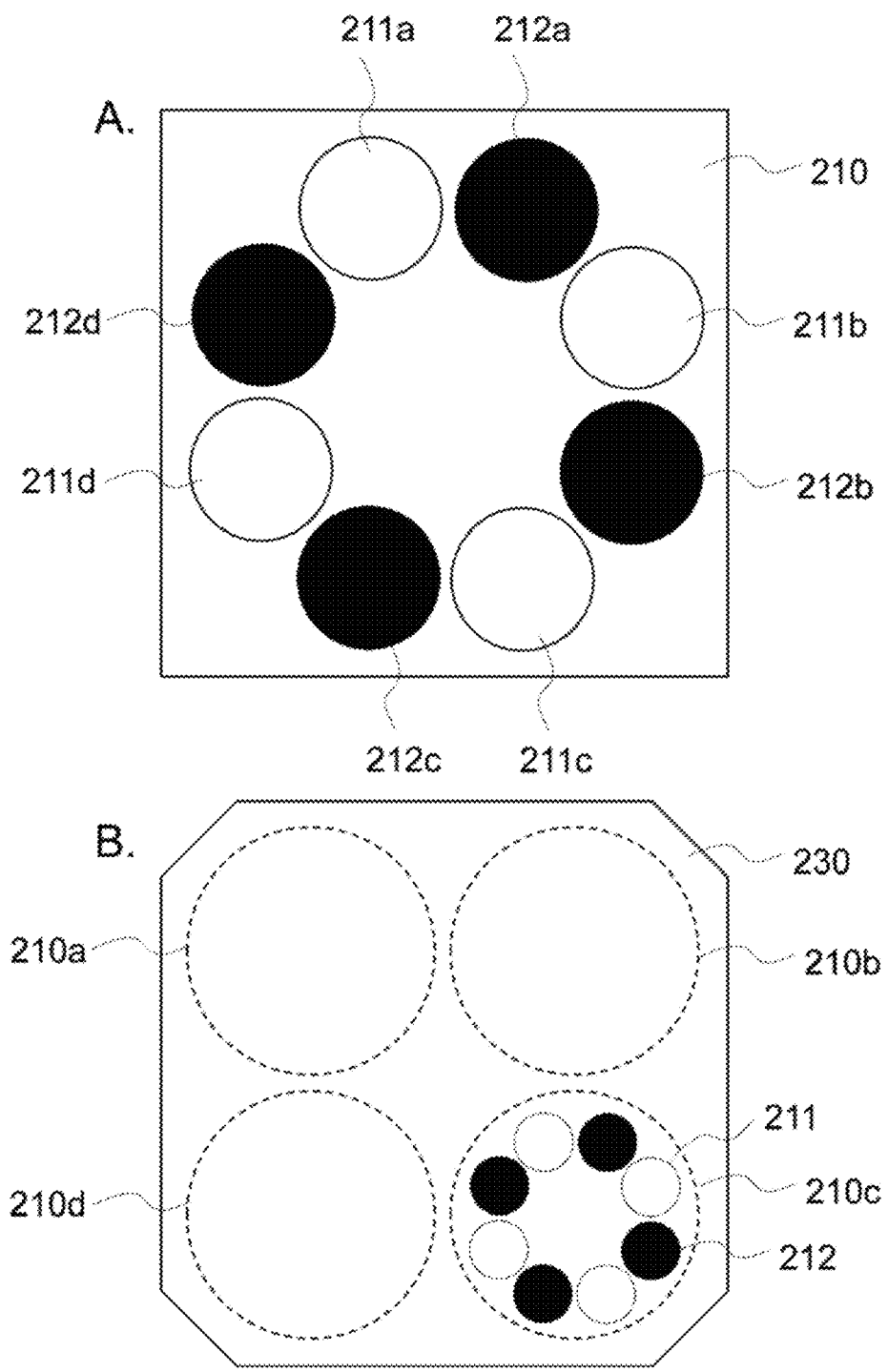
FIGS. 12A and 12B illustrate exemplary arrays of the first and second light sources disposed in a single light source area of the light source wheel in the light module according to an embodiment.

FIGS. 12A and 12B illustrate the light sources disposed in the multi-wavelength light source area according to an embodiment. The multi-wavelength light source area 210 may comprise a first light source 211 generating excitation light of the first wavelength range and a second light source 212 generating excitation light of the second wavelength range different from the first wavelength range. Thus, the multi-wavelength light source area 210 of the present disclosure may selectively generate excitation light of the excitation light or the second wavelength range.

According to an implementation of the present disclosure, the multi-wavelength light source area 210 may further comprise a light source to generate light of a wavelength range different from those of the first light source 211 and the second light source 212. The number of different wavelength ranges of excitation light that the multi-wavelength light source area may selectively generate is not specifically limited. Particularly, the number of different wavelength ranges of excitation light may be in the range of 2 to 5, 2 to 4, or 2 and 3. FIGS. 13A, 13B, and 13C respectively illustrate a multi-wavelength light source area comprising light sources that generate excitation light of two different wavelength ranges, while FIGS. 13D, 13E, and 13F respectively illustrate a multi-wavelength light source area comprising light sources that generate excitation light of three different wavelength ranges.

The number of the first light sources and the number of the second light sources comprised in the multi-wavelength light source area are not specifically limited. Specifically, each of the first light source and the second light source in the single multi-wavelength light source may be one or more light sources.

The multi-wavelength light source area of the light module according to the present disclosure may sequentially apply power to the light sources of different wavelength ranges, thereby sequentially radiating light of different wavelength ranges. Thus, the light module according to the present disclosure may excite two or more labels using a single excitation light path without spatial movement of the light source area itself or spatial movement of the light sources in the light source area. In this case, the distribution of light for each wavelength region radiated to the sample holder is required to be the same. For example, the distribution of light radiated to the sample holder must be uniform in both a case in which light emitted by the light sources of the first wavelength range is radiated alone and a case in which light emitted by the light sources of the second wavelength range is radiated alone.

In this regard, the light sources of different wavelength ranges, included in the multi-wavelength light source area, may be (1) provided on a common plane and (b) uniformly distributed.

FIGS. 12A and 12b illustrate one or more first light sources 211a, 211b, 211c, and 211d and one or more second light source 212a, 212b, 212c, and 212d of the multi-wavelength light source area 210 of the light source wheel 230 being arrayed regularly. As illustrated in FIG. 12A, one or more first light sources 211 may be arrayed regularly in an area of the light source wheel 230, i.e. the multi-wavelength light source area 210, and one or more second light sources 212 may be arrayed regularly in the same area of a light source element support structure. In addition, as illustrated in FIG. 12B, the plurality of light sources included in the multi-wavelength light source area may be arrayed regularly in a light source area 210c defined as an area in the light source wheel 230. In this case, the light sources included in the other light source areas may be located in different light source areas 210a, 210b, and 210d of the same light source wheel 230.

FIGS. 13A to 13F, illustrate a variety of implements in each of which two or three types of light sources may be arrayed regularly in the multi-wavelength light source area. As illustrated in FIGS. 13A, 13B, and 13C, first and second light sources may be arrayed regularly in the multi-wavelength light source area. As illustrated in FIGS. 13D, 13E, and 13F, in a case in which three types of light sources are arrayed in a single light source area, the light sources included in the light source area may be arrayed in an entirely regular manner. At the same time, the light sources of each wavelength range may be arrayed regularly. Such a regular array is not specifically limited. For example, as illustrated in FIGS. 13A to 13F, the array may be a circular array, a square array, a hexagon array, or the like.

In a case in which in which the wavelength range-specific light sources are arrayed regularly in the light source area (e.g. the multi-wavelength light source area) of the light source wheel, wavelength range-specific light generated by the light source area may be radiated uniformly on the same area of the sample holder. Accordingly, it is possible to radiate light of different wavelength ranges to the sample holder without a spatial movement of the light source element or the light source wheel by supplying power or stopping the supply of power to the light sources of a specific wavelength range, thereby exciting two or more different optical labels.

According to an implementation the present disclosure, the plurality of light sources included in the multi-wavelength light source area may include the same number of wavelength range-specific light sources. For example, the number of the first light sources included in the multi-wavelength light source area may be the same as the number of the second light sources included in the multi-wavelength light source area. FIG. 13A illustrates the multi-wavelength light source area including four first light sources 211 and four second light sources 212.

Figure 13:
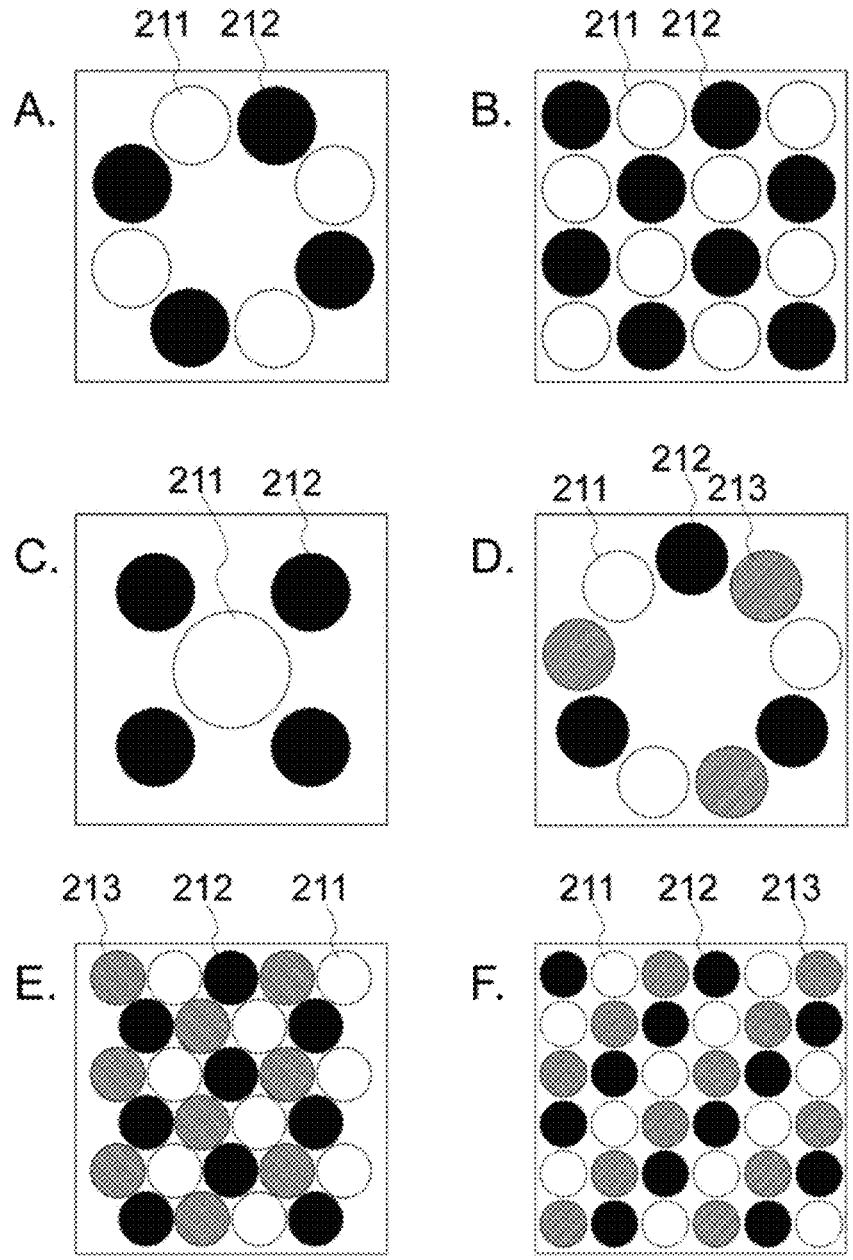
FIGS. 13A to 13F illustrate examples in which exemplary arrays of a plurality of light sources disposed in a multi-wavelength light source area according to an embodiment.

According to an implementation the present disclosure, the plurality of light sources included in the multi-wavelength light source area may include different numbers of light sources according to the wavelength range. For example, FIG. 13 illustrates the multi-wavelength light source area including a single first light source 211 and four second light sources 212. Even in the case in which the number of the first light sources differs from the number of the second light sources, the regular array of the wavelength range-specific light sources may allow excitation light to be uniformly radiated to the same area both when radiated by the first light source and when radiated by the second light source.

The number of the light sources of a specific wavelength range included in a single multi-wavelength light source area may be, for example, 1, 2, 3, 4, 5, 6, 7, 8, 9, 10, 20, 30, 40, 50, 60, 70, 80, 90, 100, 200, 300, 400, or 500, independently of the other light sources of different wavelength ranges. The number of the first light sources or the second light sources may be, for example, 1 to 1,000, 1 to 500, 1 to 100, 1 to 50, 1 to 40, 1 to 30, 1 to 20, or 1 to 10.

According to an implementation the present disclosure, the multi-wavelength light source area is configured such that excitation light of the first wavelength range and excitation light of the second wavelength range are radiated to the same sample accommodated in the sample holder. Specifically, the multi-wavelength light source area may be directed toward the sample holder such that the excitation light of the first wavelength range and the excitation light of the second wavelength range generated in the light source area may directly arrive at the sample holder, or may be directed toward a reflector or an optical fiber such that the excitation light of the first wavelength range and the excitation light of the second wavelength range may arrive at the sample holder through the reflector or the optical fiber.

Since the multi-wavelength light source area includes the first light source generating the excitation light of the first wavelength range and the second light source generating the excitation light of the second wavelength range, the excitation light of the first wavelength range and the excitation light of the second wavelength range may be selectively generated. The second wavelength range is a wavelength range different from the first wavelength range. Thus, the multi-wavelength light source area may selectively excite two or more different optical labels. According to an implementation the present disclosure, the first wavelength range comprises a wavelength range of light by which a first optical label may be excited, while the second wavelength range comprises a wavelength range of light by which a second optical label may be excited.

Each of the excitation light of the first wavelength range and the excitation light of the second wavelength range is a wavelength range of light by which a specific optical label may be excited. The optical label that may be excited by the excitation light of the first wavelength range or the excitation light of the second wavelength range may be an optical label selected from the group consisting of, but not limited to, Cy2™ YO-PRO™-1, YOYO™-1, Calcein, FITC, FluorX™, Alexa™, Rhodamine 110, Oregon Green™ 500, Oregon Green™ 488, RiboGreen™, Rhodamine Green™ Rhodamine 123, Magnesium Green™, Calcium Green™, TO-PRO™-1, TOTO1, JOE, BODIPY530/550, DiI, BODIPY TMR, BODIPY558/568, BODIPY564/570, Cy3™ Alexa™ 546, TRITC, Magnesium Orange™, Phycoerythrin R&B, Rhodamine Phalloidin, Calcium Orange™, Pyronin Y, Rhodamine B, TAMRA, Rhodamine Red™, Cy3.5™, ROX, Calcium Crimson™, Alexa™ 594, Texas Red, Nile Red, YOPRO™-3, YOYO™-3, R-phycocyanin, C-Phycocyanin, TO-PRO™-3, TOTO3, DiD DilC(5), Cy5™, Thiadicarbocyanine, Cy5.5, HEX, TET, Biosearch Blue, CAL Fluor Gold 540, CAL Fluor Orange 560, CAL Fluor Red 590, CAL Fluor Red 610, CAL Fluor Red 635, FAM, Fluorescein, Fluorescein-C3, Pulsar 650, Quasar 570, Quasar 670, and Quasar 705. In particular, the optical label that may be excited by the excitation light of the first wavelength range or the excitation light of the second wavelength range may be an optical label selected from the group consisting of, but not limited to, FAM, CAL Fluor Red 610, HEX, Quasar 670, and Quasar 705.

According to the present disclosure, the excitation light of the second wavelength range generated by the second light source included in a single multi-wavelength light source area is required to not excite an optical label excited by the excitation light of the first wavelength range, from among the optical labels included in the sample, while the excitation light of the first wavelength range generated by the first light source is required to not excite an optical label excited by the excitation light of the second wavelength range, from among the optical labels included in the sample. In this regard, the wavelength range of light generated by the first light source may be spaced apart from the wavelength range of light generated by the second light source. Specifically, the peak wavelength of the first light source may be spaced apart from the peak wavelength of the second light source by a predetermined magnitude. The peak wavelength means a wavelength having a highest light intensity from among spectra of light generated by the light source. According to an implementation the present disclosure, the peak wavelength of the first light source may be spaced apart from the peak wavelength of the second light source by a range of from 50 nm to 500 nm, 60 nm to 300 nm, or 70 nm to 200 nm.

In addition, according to an implementation the present disclosure, one or more filter areas from among the plurality of filter areas of the light module according to the present disclosure may comprise a multi bandpass filter including a first passband and a second passband.

According to the present disclosure, the bandpass filter is a filter that selectively allows light in a specific wavelength range to pass therethrough. The wavelength range of light passing through each of the bandpass filters 220 is referred to as the passband of the filter. The passband may be indicated on the basis of the wavelength range. A filter including a specific passband is a filter that allows a light of wavelength included in the specific passband to pass therethrough. A filter having a single passband is referred to as a single bandpass filter 220S. Thus, the single bandpass filter 220S selectively allows light in a single wavelength range to pass therethrough.

A filter having two or more passbands is referred to as a multi bandpass filter. That is, the multi bandpass filter selectively allows light in two or more wavelength ranges to pass therethrough. Here, the two or more passbands do not overlap each other. The number of passbands included in the multi bandpass filter may be in the range of from 2 to 5, from 2 to 4, or 2 and 3.

The number of the passbands included in the multi bandpass filter may be the same as the number of different wavelength ranges of excitation light selectively generated by the multi-wavelength light source area. The passbands included in the multi bandpass filter are formed such that different wavelength ranges of excitation light generated by the multi-wavelength light source area may pass through the multi bandpass filter.

The multi bandpass filter according to the present disclosure includes a first passband and a second passband. That is, the multi bandpass filter according to the present disclosure may allow light corresponding to the first passband or the second passband to pass therethrough. According to an implementation the present disclosure, the first passband includes the first wavelength range, while the second passband includes the second wavelength range. The first passband including the first wavelength range means that the multi bandpass filter including the first passband allows light, generated by a light source that generates light of the first wavelength range, to pass therethrough. The first wavelength range means the wavelength range of light generated by the first light source of the multi-wavelength light source area, while the second wavelength range means the wavelength range of light generated by the second light source of the multi-wavelength light source area.

Specifically, the first passband including the first wavelength range means that the multi bandpass filter including the first passband allows the entirety or a portion of the wavelength range of light, generated by the light source generating light of the first wavelength range, to pass therethrough. Thus, the passband of the multi bandpass filter including the wavelength range of light generated by the light source means that the wavelength range of the passband includes the entirety or a portion of the wavelength range of light generated by the light source. For example, in the passband of the multi bandpass filter including the wavelength range of the light source generating light of a wavelength range of from 450 nm to 650 nm, the minimum wavelength of the passband is shorter than 650 nm, the maximum wavelength of the passband is longer than 450 nm, and the maximum wavelength is longer than the minimum wavelength. According to an implementation the present disclosure, the first passband may include the entirety or a portion of the first wavelength range, while the second passband may include the entirety or a portion of the second wavelength range. The entirety or a portion of light of the first wavelength range, generated by the first light source, passes through the first passband to be irradiated to the sample accommodated in the sample holder, while the entirety or a portion of light of the second wavelength range, generated by the second light source, passes through the second passband to be irradiated to the sample accommodated in the sample holder. The minimum wavelength and the maximum wavelength of the passband are wavelengths obtaining a specific ratio of transmittance with respect to the highest transmittance of the multi bandpass filter. For example, the specific ratio may be 10%, 20%, 30%, 40%, or 50%. In particular, the specific ratio may be 50%.

According to an implementation the present disclosure, the first passband and the second passband may not overlap each other. Specifically, both the maximum wavelength and the minimum wavelength of the first passband may be shorter than the minimum wavelength of the second passband or longer than the maximum wavelength of the second passband.

Each of the first passband and the second passband may include a wavelength range of light that may excite a specific optical label. Specific types of the optical label are as described hereinbefore. In particular, the optical label may be an optical label selected from the group consisting of, but not limited to, FAM, CAL Fluor Red 610, HEX, Quasar 670, and Quasar 705.

Excitation light passing through the second passband included in a single multi bandpass filter according to the present disclosure is required to not excite an optical label excited by the excitation light passing through the first passband, from among the optical labels included in the sample. In this regard, the wavelength range of the first passband may be spaced apart from the wavelength range of the second passband. Specifically, the central wavelength (CWL) of the first light source may be spaced apart from the central wavelength of the second light source by a predetermined magnitude. The central wavelength is a wavelength corresponding to a mid-point of the minimum wavelength and the maximum wavelength of the corresponding passband. According to an implementation the present disclosure, the central wavelength of the first passband may be spaced apart from the central wavelength of the first passband by at least 10 nm, 20 nm, 30 nm, 40 nm, 50 nm, 60 nm, or 70 nm. According to an implementation the present disclosure, the central wavelength of the first passband may be spaced apart from the central wavelength of the second passband by a range of from 10 nm to 500 nm, 20 nm to 400 nm, 30 nm to 300 nm, 30 nm to 200 nm, 50 nm to 200 nm, 60 nm to 200 nm, or 70 nm to 200 nm.

From among the optical labels used to detect a target analyte, in particular, a target nucleic acid, FAM and CAL Fluor Red 610 are suitable for selective excitation through a single light source area, since absorption wavelengths thereof are spaced apart from each other. Thus, according to an implementation the present disclosure, each of the first passband and the second passband may include the wavelength range of light that may excite FAM and CAL Fluor Red 610. Specifically, the central wavelength of the first passband may range from 450 nm to 500 nm, and the central wavelength of the second passband may range from 550 nm to 600 nm.

In a case in which the multi-wavelength light source area is used alone, unnecessary wavelength ranges of light may not be precisely blocked according to the type of light sources used. In addition, it is impossible to obtain effects intended in the present disclosure by combining the multi bandpass filter to a white light source typically used in the conventional device to detect a target nucleic acid. According to the present disclosure, it is possible to selectively excite two or more optical labels using a combination of single light source area-filter areas by combining the multi-wavelength light source area capable of selectively generating excitation light of a specific wavelength range and the multi bandpass filter additionally limiting the wavelength range of the excitation light generated by the multi-wavelength light source area.

Figure 11:
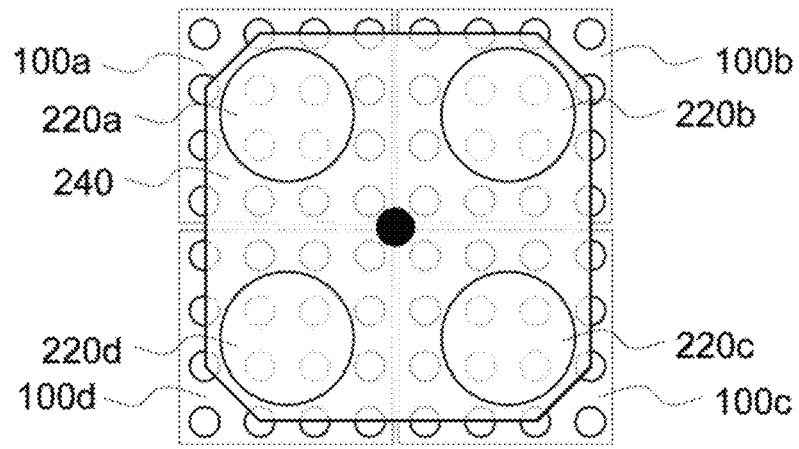
FIGS. 11A and 11B are views illustrating the positional relationships between the sample holder and the bandpass filters of the light module.
Figure 11:
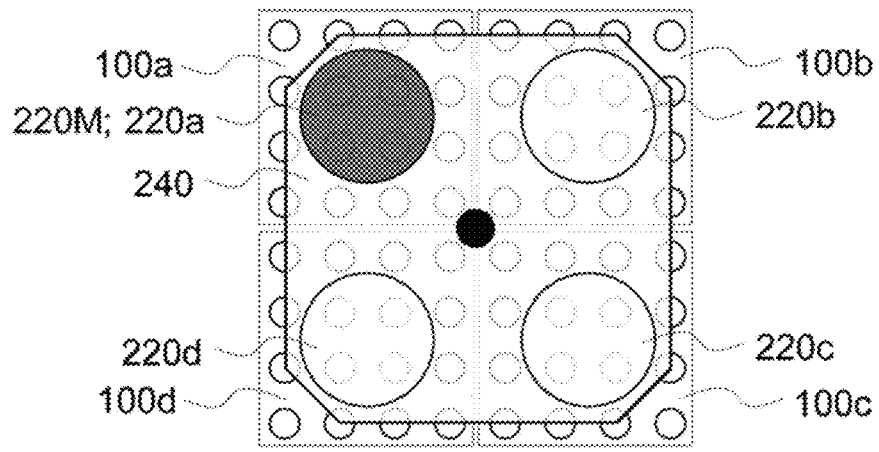

The conventional signal detection device has detected respective optical labels by combining a white light source and a plurality of single bandpass filters. Thus, in the signal detection device of the related art, the number of optical labels detectable in a single sample is the same as the number of filters included in the light module. FIGS. 11A and 11B are views illustrating the positional relationships between the sample holder 100 and the bandpass filters 220 of the light module. As one of a plurality of structures allowing excitation light generated by a light source (not shown) to arrive at the sample holder 100 through the bandpass filters 220, each of the bandpass filters 220 may be configured to directly face the sample holder 100. That is, each of the bandpass filters 220 may be located on a top portion of the corresponding area of the sample holder 100. Referring to the structure illustrated in FIGS. 11A and 11B, the bandpass filters 220a, 220b, 220c, and 220d are located on top portions of areas 100a, 100b, 100c, and 100d of the sample holder 100, respectively, such that excitation light radiated to the sample holder is in different wavelength ranges according to the filter. In addition, due to the rotation of the filter wheel 240, each of the bandpass filters 220a, 220b, 220c, and 220d may change the area of the sample holder to which the excitation light of the specific wavelength range is radiated. Accordingly, each of the bandpass filters 220a, 220b, 220c, and 220d may radiate excitation light of the specific wavelength range thereof to the entire area of the sample holder.

For example, as illustrated in FIG. 11A, four bandpass filters 220a, 220b, 220c, and 220d allowing light in different wavelength ranges to pass therethrough may be included. In a signal detection device having a structure making it difficult to increase the number of filters, maximum four optical labels may be detected, and it is difficult to increase the number of detectable labels. However, as illustrated in FIG. 11B, one or more light sources area from among the plurality of light source areas may be provided as a multi-wavelength light source area, and a light module may be provided by combining the multi-wavelength light source area and a multi bandpass filter 220M. In this case, a greater number of optical labels than the number of filters included in the light module may be detected. For example, as illustrated in FIG. 11B, in a case in which one bandpass filter 220a from among the four bandpass filters 220a, 220b, 220c, and 220d is adapted to be the dual-bandpass filter 220M (220a), a maximum number of five optical labels may be detected. The four bandpass filters may rotate to radiate excitation light of a total of five different wavelength ranges to the areas 100a, 100b, 100c, and 100d of the sample holder 100.

According to an implementation the present disclosure, the light module may comprise the multi-wavelength light source area and the multi bandpass filter corresponding to the multi-wavelength light source area.

Accordingly, the light module 200 according to the present disclosure comprises the multi-wavelength light source area and the multi bandpass filter. The light module 200 may further comprise one or more light source areas and one or more filters corresponding to the one or more light source areas. The light source area and the filter additionally comprised may be a single-wavelength light source area and a single bandpass filter or a multi-wavelength light source area and a multi bandpass filter.

Figure 14:
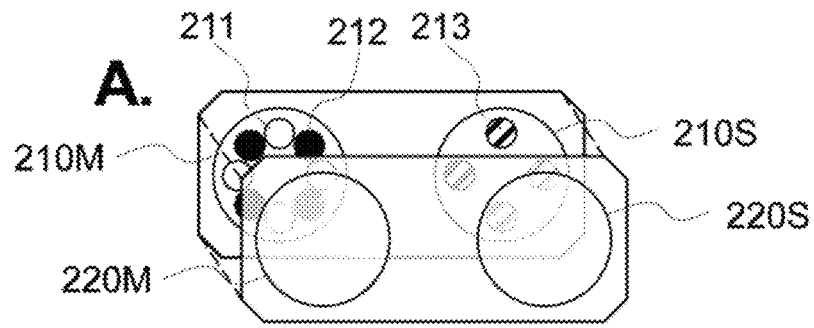
FIGS. 14A to 14C illustrate a variety of combinations of a multi-wavelength light source area and a multi bandpass filter and a variety of combinations of a single-wavelength light source area and a single bandpass filter in the light module including a plurality of light source areas and a plurality of filters according to an embodiment.
Figure 14:
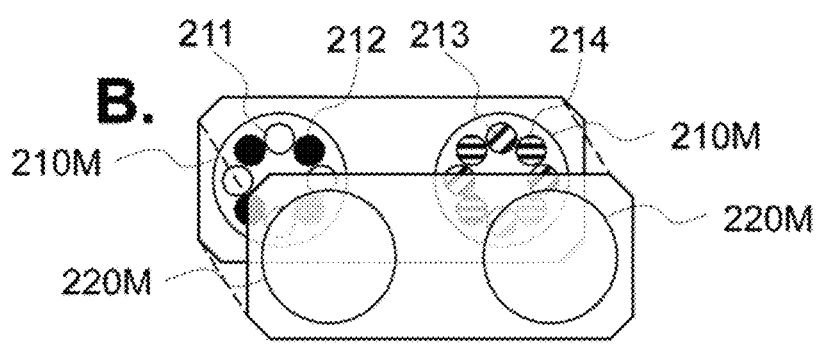
Figure 14:
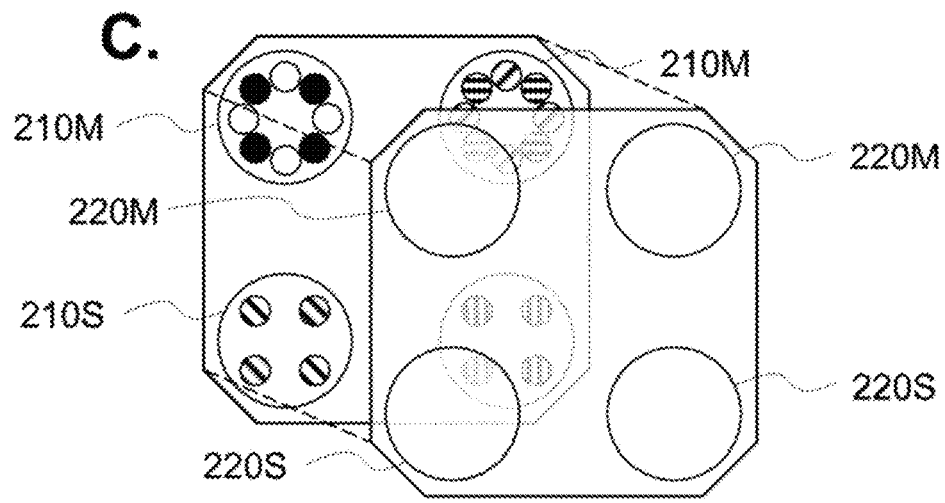

FIGS. 14A to 14C illustrate an example of the light module according to the present disclosure further comprising a single-wavelength light source area 210S and a single bandpass filter 220S or a multi-wavelength light source area 210M and a multi bandpass filter 220M. The light module 200 according to the present disclosure may further comprise the single-wavelength light source area 210S and the single bandpass filter 220S corresponding to the single-wavelength light source area 210S (FIG. 14A). In this case, the signal detection device according to the present disclosure may detect three optical labels in a discriminative manner using the two filters, so that three targets may be detected in a single sample. In addition, the light module according to the present disclosure may further additionally comprise the multi-wavelength light source area 210M and the multi bandpass filter 220M corresponding to the multi-wavelength light source area 210M (FIG. 14B). In this case, the signal detection device according to the present disclosure may detect four optical labels in a discriminative manner using the two filters. In addition, the light module 200 according to the present disclosure may further comprise a combination of the single-wavelength light source area 210S and the single bandpass filter 220S and a combination of the multi-wavelength light source area 210M and the multi bandpass filter 220M (FIG. 14C). In a case in which the light module 200 comprising the combinations illustrated in FIG. 14C is used, the signal detection device according to the present disclosure may detect six optical labels in a discriminative manner using the four bandpass filter 220. In addition, in the light module according to the present disclosure comprising the plurality of light source area and the plurality of bandpass filter including the multi-wavelength light source area and the multi bandpass filter, all of the bandpass filters of the light module may have different passbands. Thus, according to an implementation the present disclosure, the device according to the present disclosure may be a device in which the light module further comprises a single-wavelength light source area and a single bandpass filter, and in which light generated by the single-wavelength light source are is radiated through the single bandpass filter. In addition, according to an implementation the present disclosure, the device according to the present disclosure may be a device in which the light module further comprises a multi-wavelength light source area and a multi bandpass filter, and in which light generated by the added multi-wavelength light source area is radiated through the added multi bandpass filter. According to an implementation the present disclosure, the light module may comprise a plurality of light source areas and a plurality of bandpass filters, all of which have different passbands.

In addition, the wavelength range-specific numbers of the light sources included in the light module according to the present disclosure may be the same number. For example, in a case in which the number of the first light sources 211 included in the multi-wavelength light source area 210M is 4, the number of the second light sources 212 may also be 4. In addition, in a case in which the single-wavelength light source area 210S is added to the light module according to the present disclosure, the number of light sources 213 included in the added single-wavelength light source area 210S may also be 4.

As an alternative, the wavelength range-specific numbers of the light sources included in the light module according to the present disclosure may be different. For example, in a case in which the light module includes a single multi-wavelength light source area and three single-wavelength light source areas, each of the three single-wavelength light source areas may include a single light source, and the multi-wavelength light source area may include a single first light source and four second light sources.

FIGS. 15A to 15D illustrate the light module 200 according to an embodiment.

Figure 15:
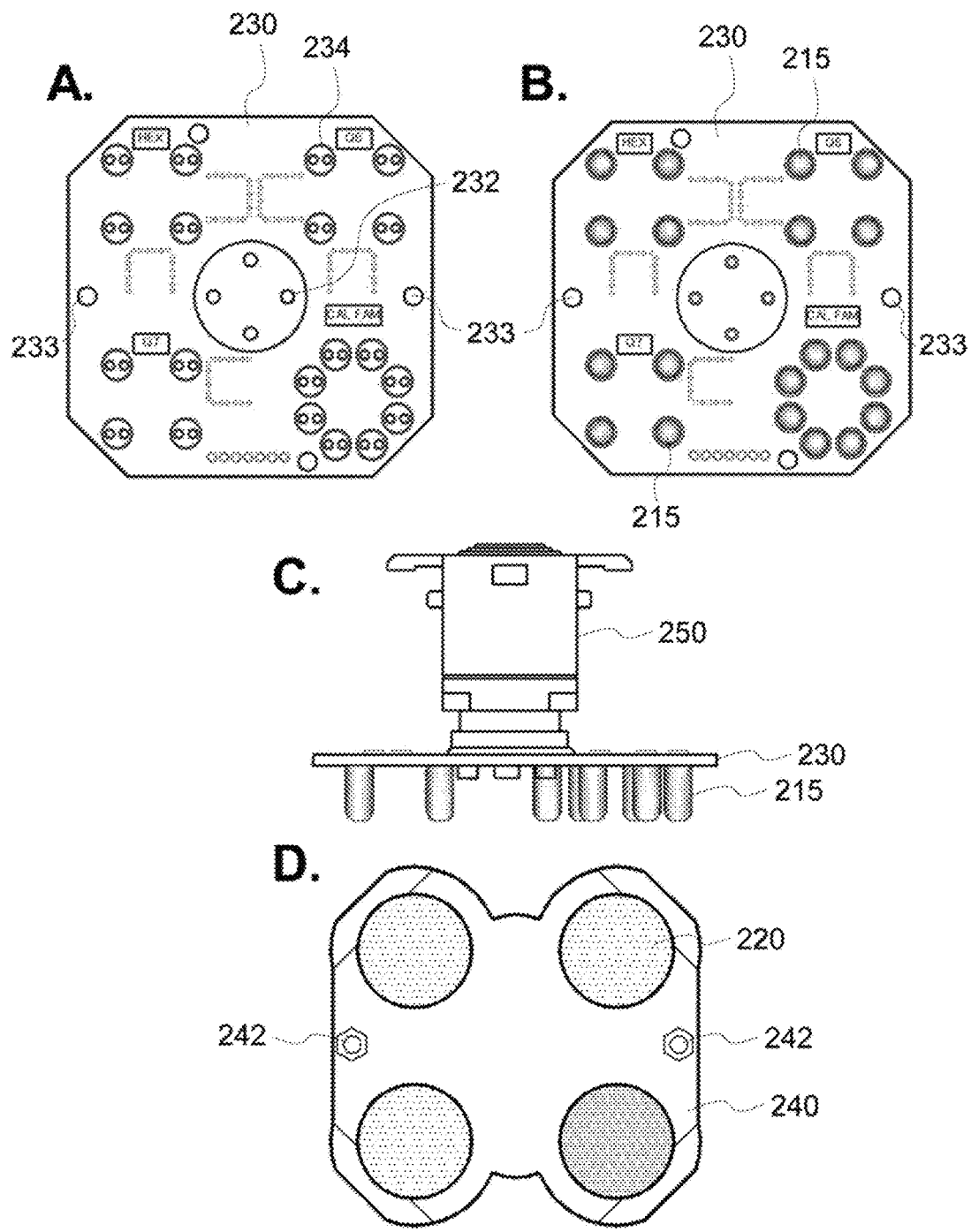

FIG. 15A illustrates the light source wheel 230 according to an implementation of the present disclosure. According to an implementation the present disclosure, the light module 200 may comprise the light source wheel 230. The light source wheel 230 accommodates and fixes the light sources 215 arrayed thereon, such that the light sources 215 may uniformly supply light to an intended area. The light source wheel 230 may be a printed circuit board (PCB). Soldering portions 234 on which the light sources 215 are mounted may be provided one surface of the light source wheel 230. FIG. 15B illustrates the light sources 215 soldered to the soldering portions 234 of the light source wheel 230.

Referring to FIG. 15A, the light source wheel 230 may have fastening holes 232 to which the motor 250 for moving the light source wheel 230 is connected. The light source wheel 230 is connected to the motor 250, i.e. a light module moving means, through the fastening holes 232.

In addition, the light source wheel 230 may have two or more filter mount fastening holes 233. The filter wheel 240 of the light module is coupled to the light source wheel through the filter mount fastening holes 233, so that light generated by each light source may be radiated to the sample holder through the bandpass filter. In addition, the motor may rotate the light source wheel 230 and the filter wheel 240 connected to the light source wheel 230, thereby allowing the light sources and the bandpass filters to radiate excitation light to the areas of the sample holder.

FIG. 15C illustrates the light sources 215 and the light source wheel 230 coupled to the motor 250, i.e. the light module moving means, according to an implementation of the present disclosure.

The light module moving means may be a means for generating power to move the filters and/or light sources of the light module. Particularly, the moving means may be the motor 250. The motor may be, for example, an alternating current (AC) motor, a direct current (DC) motor, a step motor, servo motor, or a linear motor. Particularly, the motor may be a step motor. The moving means may be directly or indirectly connected to the light source wheel 230 to move the light sources.

FIG. 15D illustrates the filter wheel 240 according to an implementation attachable to the light source wheel and a plurality of bandpass filters 220 accommodated in the filter wheel.

According to an implementation the present disclosure, the light module 200 may comprise the filter wheel 240. The bandpass filters of the light module 200 according to the present disclosure are mounted and arrayed on the light module filter wheel 240. The light module filter wheel 240 may have one or more filter insertion holes, and may have fastening holes 242 corresponding to the two or more filter mount fastening holes 233 of the light source wheel 230.

In a case in which the device according to the present disclosure comprises the plurality of light source areas and the bandpass filters corresponding to the light source areas, each of the plurality of light source areas may be configured to radiate light to the same area of the sample holder through the bandpass filter. The plurality of target nucleic acid may not be detected from the sample unless each of the plurality of light source areas may radiate light to the sample accommodated by the sample holder.

There may be a variety of methods by which each of the plurality of light source areas may radiate light to the same area of the sample holder through the corresponding bandpass filter.

For example, in a case in which the light source area is configured to simultaneously radiate light to the entirety of the sample holder, the plurality of light source areas may be configured such that radiation angles thereof are adjusted, such that the plurality of light source areas may radiate light to the same area of the sample holder without movement of the light sources or the bandpass filter. In addition, the device according to the present disclosure may be configured such that each of the plurality of light source areas may radiate light to the same area of the sample holder through the corresponding bandpass filter by the movement of the sample holder. In addition, an optical fiber receiving light from the respective light source areas may be provided, and a light collector of the optical fiber may be connected to the moving means, such that light generated by the plurality of light source areas may be transferred to the sample holder after having passed through the bandpass filter.

Alternatively, a moving means may be added to the light module to move the plurality of light source areas and the plurality of bandpass filters corresponding to plurality of light source areas, so that the plurality of light source areas may sequentially radiate light to the same area of the sample holder.

Figure 16:
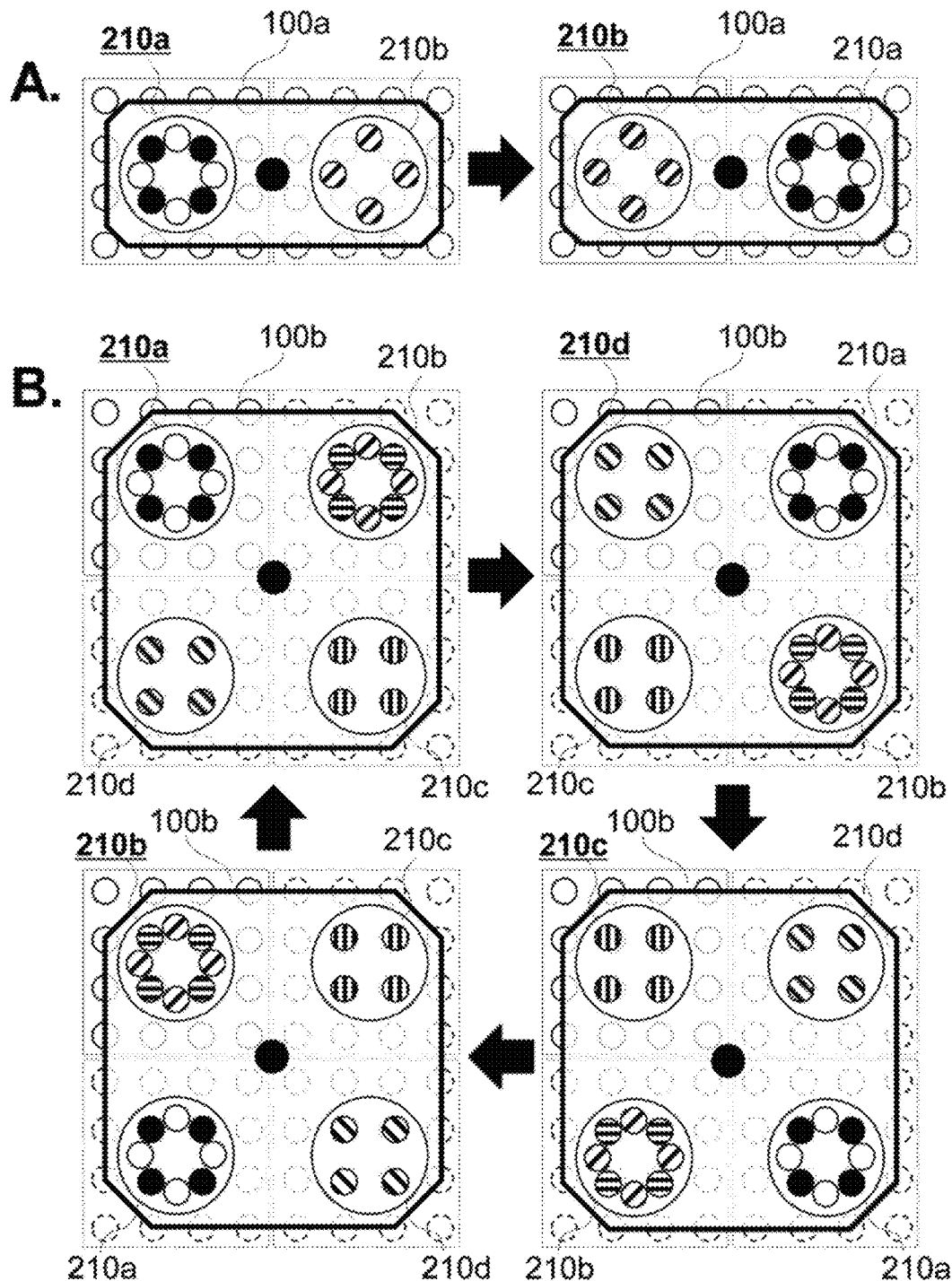
FIGS. 16A and 16B illustrate an example in which a multi-wavelength light source area and a single-wavelength light source area move to radiate excitation light to a single area of the sample holder.

FIGS. 16A and 16B illustrate an example in which the plurality of light source areas 210 of the light module 200 according to the present disclosure may be located to radiate excitation light to the same area of the sample holder 100, indicated with solid lines, in response to rotational movement of the light module. In the light module comprising two light source areas 210a and 210b as illustrated in FIG. 16A, in a first time, the first light source area 210a may radiate excitation light to the area 100a of the sample holder indicated with solid lines, and in a second time, the second light source area 210b may move to the position in which the first light source area has been located to radiate excitation light the area 100a of the sample holder indicated with solid lines. In addition, in the light module comprising four light source area 210a, 210b, 210c, and 210d as illustrated in FIG. 16B, first to fourth light source areas 210a, 210b, 210c, and 210d may sequentially radiate light to radiate excitation light the area 100a of the sample holder indicated with solid lines, in response to rotational movement carried out by the moving means.

According to an implementation the present disclosure, the device according to the present disclosure comprises a light module moving means. The light module moving means may be configured to move one or more light source areas of the light module such that all of the light source areas may radiate light to the same area of the sample holder.

Referring to FIG. 1, the signal detection device according to the present disclosure comprises the detection module 300. The detection module detects an optical signal generated by a sample accommodated in the signal detection device according to the present disclosure. The detection module may detect the optical signal generated by the sample to determine the presence and/or amount of a target analyte in a target. The optical signal may be generated by luminescence signal, phosphorescence, phosphorescence, fluorescence, or polarized fluorescence, or may be a colored signal.

The detection module may comprise detectors and detection filters.

Figure 17:
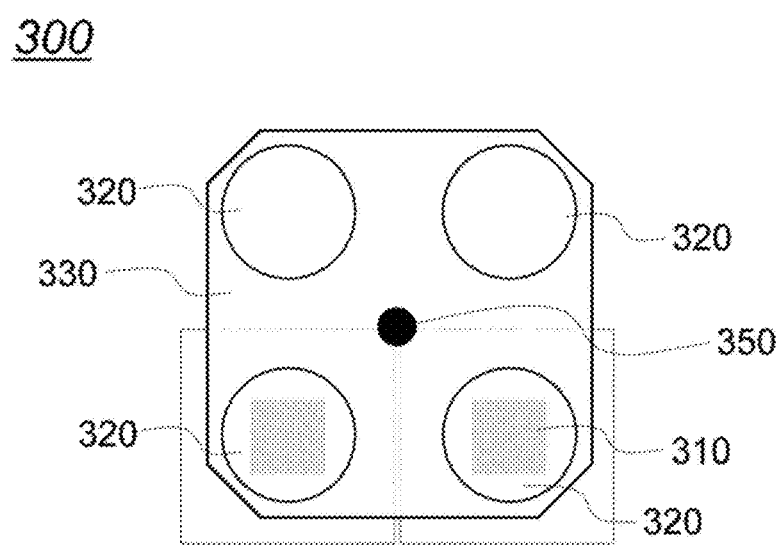
FIG. 17 illustrates a detection module comprising a filter wheel including a plurality of bandpass filters and a detector according to an embodiment.

Referring to FIG. 17, the detection module 300 according to an implementation the present disclosure may comprise the detectors 310 and the detection filters 320.

The respective detection filters of the detection module are a filter that selectively allows emission light emitted by an optical label included in the sample to pass therethrough. In a case in which light of another wavelength range, different from the emission light emitted by the optical label included in the sample, is detected by the light detector, the target nucleic acid may not be accurately detected. The detection filter of the detection module may selectively allow the emission light emitted by the optical label to pass therethrough, so that the target nucleic acid may be accurately detected.

According to an implementation the present disclosure, the detection module may comprise the multi bandpass filter.

Specifically, the multi bandpass filter of the detection module may include the third passband and the fourth passband. That is, the multi bandpass filter of the detection module according to the present disclosure may allow light corresponding to the third passband and the fourth passband to pass therethrough. The third passband includes a wavelength range through which emission light of the optical label excited by excitation light of the first wavelength range passes, while the fourth passband includes a wavelength range through which emission light of the optical label excited by excitation light of the second wavelength range passes. Thus, according to an implementation the present disclosure, the third passband may include the wavelength range of emission light emitted by the optical label that may be excited by excitation light passing through the first passband, while the fourth passband may include the wavelength range of emission light emitted by the optical label that may be excited by excitation light passing through the second passband.

Specifically, the third passband may include the entirety or a portion of the wavelength range of emission light emitted by the optical label that may be excited by excitation light passing through the first passband, while the fourth passband may include the entirety or a portion of the wavelength range of emission light emitted by the optical label that may be excited by excitation light passing through the second passband.

According to an implementation the present disclosure, the passband of the multi bandpass filter of the light module and the passband of the multi bandpass filter of the detection module are not determined independently of each other. The multi bandpass filter of the light module has the passband including the wavelength range of excitation light of an optical label to be detected, while the multi bandpass filter of the detection module has the passband including the wavelength range of emission light of the same optical label. Accordingly, the relationship between the passbands of the two multi bandpass filters may be determined such that each of the passbands includes the wavelength range of excitation light of a optical label to be detected and the wavelength range of emission light emitted from the optical label.

According to an implementation the present disclosure, the third passband and the fourth passband of the multi bandpass filter of the detection module may not overlap each other. Specifically, both the maximum wavelength and the minimum wavelength of the third passband may be shorter than the minimum wavelength of the fourth passband or may be longer than the maximum wavelength of the fourth passband.

Each of the third passband and the fourth passband may include the wavelength range of emission light emitted by a specific optical label. Specific types of the optical label are as described hereinbefore. In particular, the optical label may be an optical label selected from the group consisting of, but not limited to, FAM, CAL Fluor Red 610, HEX, Quasar 670, and Quasar 705.

The fourth passband included in the single multi bandpass filter according to the present disclosure is required to have a structure that prevents emission light of an optical label that emits light passing through the third passband, from among the optical labels included in the sample, from passing through the fourth passband. In this regard, the wavelength range of the third passband and the wavelength range of the fourth passband may be spaced apart from each other. Specifically, the central wavelength (CWL) of the third passband and the central wavelength of the fourth passband may be spaced apart from each other by a predetermined magnitude.

According to an implementation the present disclosure, the central wavelength of the third passband and the central wavelength of the fourth passband may be spaced apart from each other by at least 10 nm, 20 nm, 30 nm, 40 nm, 50 nm, 60 nm, or 70 nm. According to an implementation the present disclosure, the central wavelength of the third passband and the central wavelength of the fourth passband may be spaced apart from each other by a range of from 10 nm to 500 nm, 20 nm to 400 nm, 30 nm to 300 nm, 30 nm to 200 nm, 50 nm to 200 nm, 60 nm to 200 nm, or 70 nm to 200 nm.

For example, from among the optical labels used to detect a target nucleic acid, FAM and CAL Fluor Red 610 are suitable for selective excitation through a single detection module, since absorption wavelengths thereof are spaced apart from each other. Thus, according to an implementation the present disclosure, each of the third passband and the fourth passband may include the wavelength ranges of light emitted by FAM and CAL Fluor Red 610. Specifically, the central wavelength of the third passband may range from 500 nm to 550 nm, and the central wavelength of the fourth passband may range from 600 nm to 670 nm.

Figure 18:
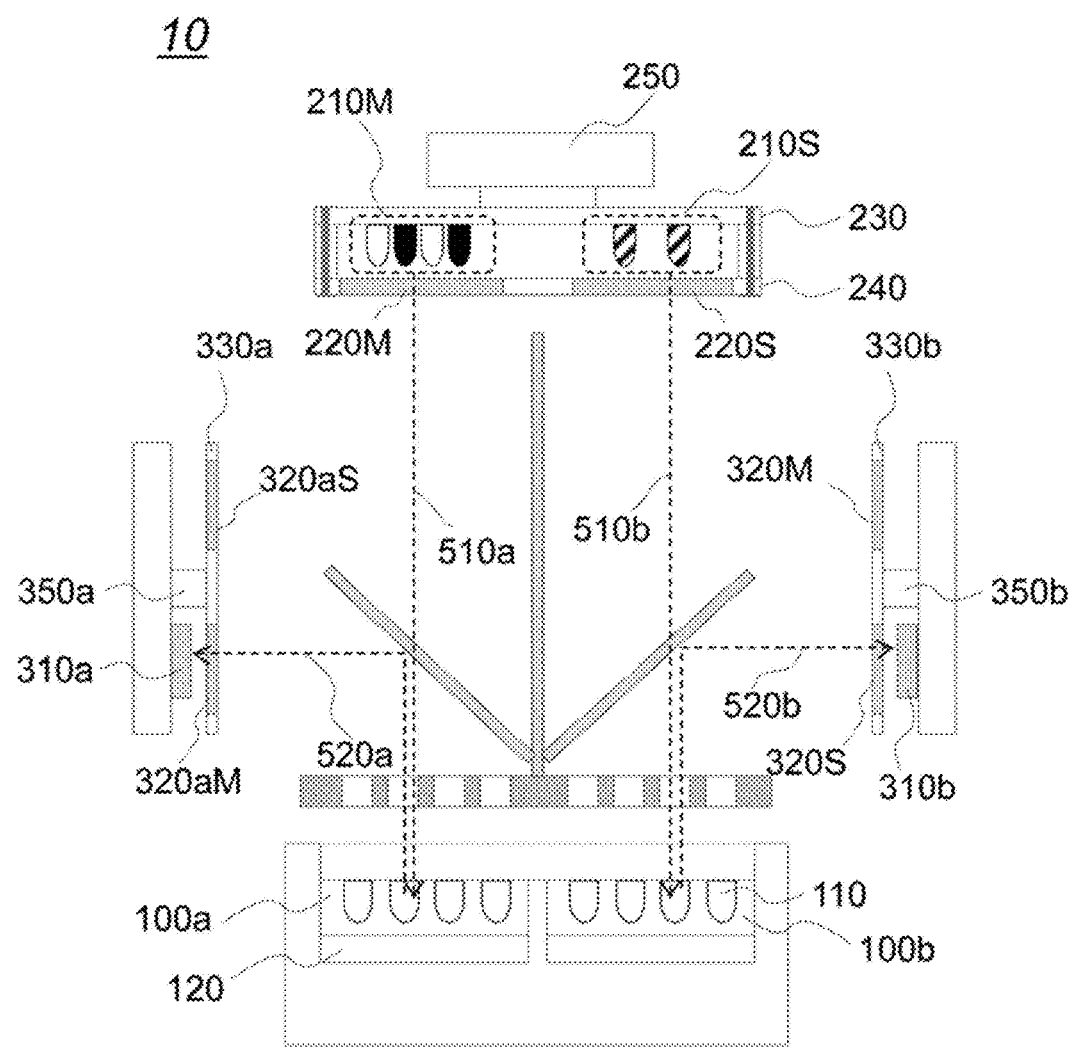
FIG. 18 is a schematic view illustrating a device comprising a light module, a detection module, and a sample holder according to an embodiment.

FIG. 17 illustrates the detection module 300 including the plurality of detection filters 320, and FIG. 18 illustrates the signal detection device including the detection module.

According to an implementation the present disclosure, the detection module may further comprise the multi bandpass filter or the single bandpass filter. As illustrated in FIG. 17, the detection module 300 may comprise the plurality of detection filters 320. The plurality of detection filters 320 may be multi bandpass filters or single bandpass filters, the number and type of which may be determined depending on the bandpass filters of the light module. Specifically, as illustrated in FIG. 18, when excitation light 510a generated by the multi-wavelength light source area 210M arrives at the first area 100a of the sample holder after having passed through the multi bandpass filter 220M of the light module, emission light of a specific wavelength range is generated by the sample in response to the excitation light 510a. To detect the emission light, a detection filter 320M selectively allowing the emission light to pass therethrough is located on an emission light path 520a. In addition, in a case in which the single-wavelength light source area 210S and the single bandpass filter 220S are located in positions of the multi-wavelength light source area 210M and the multi bandpass filter 220M by the motor 250 as a moving module, excitation light generated by the single-wavelength light source area 210S may be radiated to the sample through the single bandpass filter 220S, and new emission light of a wavelength range different from the emission light generated by the multi-wavelength light source area 210M may be emitted from the sample. To detect the new emission light, a detection filter 320aS different from the bandpass filter 320aM may be located on the emission light path 520a.

The positions of the light source areas 210 and the bandpass filters 220 of the light module are moved by the motor 250 serving as the light module moving means, and excitation light of a variety of wavelength ranges is radiated to the sample holder. Synchronizedly, the positions of the detection filters 320 are moved by the motor 250 serving as the light module moving means, so that the detection filters 320 selectively allow the emission light in the variety of wavelength ranges generated by the excitation light to pass therethrough.

Accordingly, the number and type of the plurality of detection filters 320 of the detection module 300 may vary depending on the number and type of the bandpass filters 220 of the light module 200. Specifically, in the device according to the present disclosure, in a case in which the multi bandpass filter or the single bandpass filter is added to the light module 200, a multi bandpass filter or a single bandpass filter corresponding thereto may be added to the detection module 300. For example, in a case in which a single bandpass filter allowing light capable of exciting an optical label HEX to pass therethrough is added to the light module, a single bandpass filter allowing emission light of HEX to pass therethrough may be added to the detection module. In this case, a single bandpass filter including a passband of a central wavelength ranging from 510 nm to 560 nm may be used in the light module, and a single bandpass filter including a passband of a central wavelength ranging from 570 nm to 620 nm may be used in the detection module, in consideration of the emission light wavelength range of HEX. In another example, in a case in which a multi bandpass filter allowing excitation light capable to exciting optical labels HEX and Quasar 705 to pass therethrough is added to the light module, a multi bandpass filter allowing emission light of HEX and Quasar 705 to pass therethrough may be added to the detection module. In this case, a multi bandpass filter including both a passband of a central wavelength ranging from 510 nm to 560 nm and a passband of a central wavelength ranging from 640 nm to 680 nm may be used in the light module, and a multi bandpass filter including both a passband of a central wavelength ranging from 570 nm to 610 nm and a passband of a central wavelength ranging from 710 nm to 750 nm may be used in the detection module, in consideration of the emission light wavelength ranges of HEX and Quasar 705.

According to an implementation the present disclosure, the device according to the present disclosure may comprise the detection module moving means configured to move the detection filters of the detection module. Referring to FIG. 18, the detection module moving means moves the detection filter 320 of the detection module so that a suitable bandpass filter is located on the path of emission light according to the wavelength range of excitation light that the light module radiates to the sample. Accordingly, the detection module moving means may be configured to move the detection filters of the detection module according to the wavelength range of the excitation light radiated to the sample. The detection module moving means may be motors 350a and 350b generating power to move the detection filters of the detection module. The respective motors may be, for example, an AC motor, a DC motor, a step motor, servo motor, or a linear motor. Particularly, the respective motors may be a step motor. The motors 350a and 350b may be directly or indirectly connected to filter wheels 330a and 350b of the detection module to move the detection filters 320 of the detection module.

According to an implementation the present disclosure, the detection module 300 may comprise the filter wheels 330 (330a, 350b). The detection filters 320 of the detection module according to the present disclosure are mounted and arrayed on the filter wheels 330 of the detection module. The respective filter wheels 330 of the detection module may have one or more filter insertion holes to which the detection filters 320 are fitted.

In addition, the device according to the present disclosure may comprise the detectors 310. The respective detectors are configured to detect emission light emitted by the optical labels included in the sample. The detector may be configured to detect wavelength-specific light intensities by discriminating the wavelength of light or detect a total intensity of light regardless of the wavelength. Specifically, the detector may be implemented as, for example, a photodiode, a photodiode array, a photomultiplier tube (PMT), a charge-coupled device (CCD) image sensor, a complementary metaloxide-semiconductor (CMOS) image sensor, or an avalanche photodiode (APD).

The detectors 310 are configured to detect emission light emitted by the optical labels included in the sample. Specifically, the detectors 310 are configured to be able to detect emission light emitted by the optical labels included in the sample.

According to an implementation the present disclosure, the detectors 310 may be located on the paths 520a and 520b of emission light generated by the sample holder. Specifically, the detectors may be directed toward the sample holder such that emission light generated by the sample may directly arrive at the detectors, or may be directed toward the reflectors or the optical fibers such that the emission light may arrive at the detectors through the reflectors or the optical fibers. In the case of FIG. 18, the detectors may be directed toward a beam splitter that reflects emission light.

According to an implementation the present disclosure, the detectors may be a plurality of detectors. In this case, each of the plurality of detectors 310a and 310b may be configured to detect emission light generated in a predetermined area of the sample holder. Referring to FIG. 18, the first detector 310a may be configured to detect emission light 520a emitted by the first area 100a of the sample holder, while the second detector 310b may be configured to detect emission light 520b emitted by the second area 100b of the sample holder. According to an implementation the present disclosure, the device according to the present disclosure may detect a plurality of signals in the first area 100a of the sample holder and detect a plurality of signals in the second area 100b of the sample holder.

First excitation light is radiated to the first area 100a of the sample holder by the multi-wavelength light source area 210M and the multi bandpass filter 220M of the light module. When emission light is emitted in response to the first excitation light, the multi bandpass filter 320aM of the detection module corresponding to the emission light may be located on the emission light path between the detector 310a and the first area 100a of the sample holder, thereby allowing the detector 310a to detect the emission light. The light module moves so that second excitation light is radiated to the first area 100a of the sample holder by the single-wavelength light source area 210S and the single bandpass filter 220S of the light module. When emission light is emitted in response to the second excitation light, the single-wavelength light source area 210S and the single bandpass filter 320aS of the detection module corresponding to the single bandpass filter 220S of the light module are located on the emission light path by the motor 350 serving as the detection module moving means, so that the detector 310a may detect the emission light. As described above, the detector 100a may detect the emission light of a variety of wavelength ranges generated by the predetermined area 100a of the sample holder, thereby detecting a plurality of signals in the first area 100a of the sample holder.

The same mechanism allows the detector 310b to detect the emission light of a variety of wavelength ranges occurring in the predetermined area 100b of the sample holder, i.e. the second area 100b of the sample holder, and a plurality of signals may be detected in the second area 100b of the sample holder.

III. Method of Detecting a Plurality of Signals Using Light Module and Signal Detection Device According to the Present Disclosure According to another aspect of the present disclosure, the present disclosure provides a method of detecting a plurality of signals emitted from samples, the method including the following steps of:
  (a) locating samples in a sample holder of a signal detection device;
    wherein the signal detection device includes a light module, the sample holder accommodating a plurality of reaction vessels, and a detection module detecting signals emitted from the samples included in the reaction vessels;
    wherein the light module comprises a plurality of light sources emitting light to excite the samples, a light source wheel accommodating the plurality of light sources, a plurality of filters filtering light emitted by the light sources, a filter wheel accommodating the plurality of filters, and a motor rotating the light source wheel and the filter wheel, the light source wheel being divided into a plurality of light source areas including a first light source area and a second light source area, and one or more light sources being disposed in each of the light source areas;
  (b) generating excitation light of a first wavelength range from the first light source area to be radiated to the samples through one filter from among the plurality of filters of the light module;
  (c) detecting emission light emitted from the samples using the detection module;
  (d) rotating the light source wheel and the filter wheel so that the second light source area is located in the position of the first light source area;
  (e) generating excitation light of a second wavelength range from the second light source area to be radiated to the samples through one filter from among the plurality of filters of the light module; and
  (f) detecting the emission light emitted from the samples using the detection module.

Hereinafter, the method according to the present disclosure will be described according to steps thereof.

In step (a), the samples are located in the sample holder of the signal detection device.

The device is a device that detects signals from the samples. According to an implementation the present disclosure, such signals may indicate the presence of a target nucleic acid within the samples. Accordingly, the device according to the present disclosure may be a detection device for a target nucleic acid, while the method according to the present disclosure may be a method of detecting a target nucleic acid within samples. The signal detection device comprises the light module, the sample holder accommodating the plurality of reaction vessels, and the detection module detecting the signals emitted from the samples included in the reaction vessels.

In addition, the light module comprises the plurality of light sources emitting light to excite the samples, the light source wheel accommodating the plurality of light sources, the plurality of filters filtering light emitted by the light sources, the filter wheel accommodating the plurality of filters, and the motor rotating the light source wheel and the filter wheel, the light source wheel being divided into a plurality of light source areas including a first light source area and a second light source area, and one or more light sources being disposed in each of the light source areas.

Features of the light module, the sample holder, and the detection module are the same as described above in Section I.

In step (b), the excitation light of a first wavelength range is generated by the first light source area and is radiated to the samples through one filter from among the plurality of filters of the light module.

The excitation light of the first wavelength range excites a first optical label included in the sample depending on the presence or amount of a target analyte in the sample. The target analyte causing the first optical label to be excited by the excitation light of the first wavelength range is referred to as a first target analyte to be discriminated from the other target analytes.

The excitation light of the first wavelength range generated by the first light source area is radiated to the samples through one filter among the plurality of filters of the light module. The filter is a filter through which the excitation light of the first wavelength range passes.

In step (c), the detection module detects the emission light emitted from the samples.

In a case in which the first target analyte is present in a sample, when the excitation light of the first wavelength range is radiated to the sample, the emission light generated by the first optical label is emitted from the sample.

The emission light emitted from the sample in step (c) is emitted by the first optical label excited by the excitation light of the first wavelength range radiated in step (b).

The detection module comprises a detector able to detect emission light. The detector may detect wavelength-specific light intensities by discriminating the wavelength of light or detect a total intensity of light regardless of the wavelength. Specifically, the detector may be implemented as, for example, a photodiode, a photodiode array, a photomultiplier tube, a CCD image sensor, a CMOS image sensor, or an avalanche photodiode.

According to an implementation the present disclosure, the detection module may include a detection filter. The detection filter may be a plurality of detection filters, and each of the plurality of detection filters includes a passband detection filter having a passband in a wavelength range through which the emission light emitted by the first optical label may pass. The emission light emitted from the sample in step (c) may be detected by the detector through the detection filter.

In step (d), the light source wheel and the filter wheel are rotated so that the second light source area is located in the position of the first light source area.

In the method according to the present disclosure, after the detection of a single signal emitted from the sample is completed, the light source is moved so that the second light source area is located in the position in which the first light source area has been located, so that a different signal is detected from the same sample. In this regard, the light source wheel including the first light source area and the second light source area is rotated to change the positions of the light source areas. Here, the filter wheel in which the plurality of filters are accommodated is rotated together, thereby changing the positions of the filters.

The method according to the present disclosure is characterized in that, during rotational movement of the plurality of light source areas, the positions of the corresponding filters are also moved.

For example, in a case in which the light source wheel is rotated so that the second light source area is located in the position of the first light source area, the filter wheel is rotated together, so that the filter corresponding to the second light source area moves to a position in which the excitation light generated by the second light source area may pass through the filter.

In step (e), the excitation light of the second wavelength range is generated by the second light source area and is radiated to the sample through one filter from among the plurality of filters of the light module.

The light source of the second light source area generates the excitation light of the second wavelength range. The excitation light of the second wavelength range excites the second optical label included in the sample depending on the presence or amount of the target analyte in the sample. A target analyte exciting the second optical label by the excitation light of the second wavelength range is referred to as a second target analyte in order to be discriminated from the above-described first target analyte.

The excitation light of the second wavelength range generated by the second light source area is radiated to the sample through one filter from among the plurality of filters of the light module. The filter is a filter through which the excitation light of the second wavelength range passes.

In step (f), the emission light emitted from the sample is detected by the detection module.

In a case in which the second target analyte is present within the sample, when the excitation light of the second wavelength range is radiated to the sample, the emission light generated by the second optical label is emitted from the sample.

The emission light emitted from the sample in step (f) is emitted by the second optical label excited by the excitation light of the second wavelength range radiated in step (e).

According to an implementation the present disclosure, the detection module may comprise the plurality of detection filters, each of which includes a passband detection filter having a passband in a wavelength range allowing the emission light emitted by the second optical label to pass therethrough. The emission light emitted from the sample in step (e) may be detected by the detector through the detection filter.

As described above, the method according to the present disclosure may detect a plurality of signals emitted from the sample.

The operation of detecting the plurality of signals emitted from the sample may be an operation of detecting the target analyte in the sample. According to an implementation the present disclosure, the target analyte may be a target nucleic acid.

Accordingly, the method according to the present disclosure may be a method of detecting a plurality of target nucleic acids from the sample. The method of detecting the plurality of target nucleic acid may further include the following step: (g) detecting a plurality of target nucleic acid from the samples in accordance with a result of the detection of the emission light.

In addition, in the light module according to the present disclosure, at least one light source area from among the plurality of light source areas may be a multi-wavelength light source area in which a first light source emitting light of the first wavelength range and a second light source emitting light of the second wavelength range different from the first wavelength range are disposed. The plurality of target nucleic acids may be detected using the multi-wavelength light source area of the light module according to the present disclosure.

According to another aspect of the present disclosure, the present disclosure provides a method of detecting a plurality of signals emitted from samples, the method including the following steps of:

(a) locating samples in a sample holder of a signal detection device;
wherein the signal detection device comprises a light module, the sample holder accommodating a plurality of reaction vessels, and a detection module detecting signals emitted from the samples included in the reaction vessels;
wherein the light module comprises a plurality of light sources emitting light to excite the samples, a light source wheel accommodating the plurality of light sources, a plurality of filters filtering light emitted by the light sources, a filter wheel accommodating the plurality of filters, and a motor rotating the light source wheel and the filter wheel, the light source wheel being divided into a plurality of light source areas, and one or more light sources being disposed in each of the light source areas;
wherein at least one light source area from among the plurality of light source areas is a multi-wavelength light source area in which a first light source emitting light of a first wavelength range and a second light source emitting light of a second wavelength range different from the first wavelength range are disposed;
wherein the filter wheel is divided into a plurality of filter areas, in each of which one or more filters are disposed, and one or more filter areas from among the plurality of filter areas comprise a multi bandpass filter including a first passband and a second passband;
wherein the detection module comprises (i) a detector and (ii) a multi bandpass filter including a third passband and a fourth passband, the detector being able to detect the signals emitted from the samples;
wherein the samples respectively include a first optical label that may be excited by the excitation light of the first wavelength range and a second optical label that may be excited by the excitation light of the second wavelength range;

(b) generating excitation light of a first wavelength range from the first light source area to be radiated to the samples through a multi bandpass filter of the light module;

(c) detecting signals emitted from the samples by a detector through the multi bandpass filter of the detection module;

(d) generating excitation light of a second wavelength range from the multi-wavelength light source area to be radiated to the samples through the multi bandpass filter of the light module; and (e) detecting signals emitted from the samples by the detector through the multi bandpass filter of the detection module.

Hereinafter, the method according to the present disclosure will be described according to steps thereof.

In step (a), the samples are located in the sample holder of the signal detection device.

The signal detection device comprises the light module, the sample holder accommodating the plurality of reaction vessels, and the detection module detecting the signals emitted from the samples included in the reaction vessels.

The sample holder is configured to be able to accommodate the samples respectively including an optical label capable of emitting emission light. The light module is configured to be able to radiate excitation light to the samples accommodated in the sample holder. The signals may be optical signals, for example, emission light emitted from the samples.

The light module comprises the plurality of light sources emitting light to excite the samples, the light source wheel accommodating the plurality of light sources, the plurality of filters filtering light emitted by the plurality of light sources, the filter wheel accommodating the plurality of filters, and the motor rotating the light source wheel and the filter wheel. The light source wheel is divided into a plurality of light source areas, with one or more light sources being disposed in each of the light source areas.

At least one light source area from among the plurality of light source areas is the multi-wavelength light source area in which the first light source emitting light of the first wavelength range and the second light source emitting light of the second wavelength range different from the first wavelength range are disposed. The multi-wavelength light source area is configured to be able to radiate the excitation light of the first wavelength range and the excitation light of the second wavelength range to the samples accommodated in the sample holder.

In addition, the filter wheel is divided into the plurality of filter areas, in each of which one or more filters are disposed. One or more filter areas from among the plurality of filter areas comprise the multi bandpass filter including the first passband and the second passband.

The detection module comprises the detector and the multi bandpass filter including the third passband and the fourth passband. The detector is configured to be able to detect the signals emitted from the samples.

The samples respectively include the first optical label that may be excited by the excitation light of the first wavelength range and the second optical label that may be excited by the excitation light of the second wavelength range.

Features of the sample holder, the light module, and the detection module are the same as described above in Section I and Section II.

According to an implementation the present disclosure, the light module comprises the light source wheel to which the first light source and the second light source are fixed. The first light source and the second light source may be arrayed regularly in the same area of the light source wheel. The first light source and the second light source may be one or more first light sources and one or more second light sources. The light source wheel fixes the light sources arrayed thereon such that the light sources may uniformly supply light to an intended area. The light source wheel may be a printed circuit board (PCB) on which electric lines are provided, such that a voltage may be applied thereto from an external source. Features of the light source wheel are the same as described above in Section I and Section II.

In step (b), the excitation light of the first wavelength range is generated from the first light source area and is radiated to the samples through the multi bandpass filter of the light module.

The excitation light of the first wavelength range is excitation light generated by the first light source of a multi-wavelength light source unit. The multi-wavelength light source unit is configured to be able to apply power to the first light source and the second light source independently of each other. The excitation light of the first wavelength range may be generated by selectively applying power to the first light source from among the light sources of the multi-wavelength light source unit. The excitation light of the first wavelength range excites the first optical label included in the sample, depending on the presence or amount of a target analyte in the sample. The first optical label is an optical label that may be excited by excitation light passing through the first passband.

The multi bandpass filter of the light module includes the first passband and the second passband. The first passband includes the entirety or a portion of the first wavelength range. The light module bandpass filter serves to prevent the optical label in the sample, excitable by light of the first wavelength range, from being excited by light of the other wavelength ranges except for the light of the first wavelength range. Accordingly, due to step (b), the sample may be irradiated by the excitation light capable of exciting the first optical label.

In step (c), the multi bandpass filter of the detection module detects the signals emitted from the samples.

The signals emitted from the samples in step (c) are optical signals. In particular, the signals are emission light emitted from the samples. The emission light emitted from the samples in step (c) is light emitted by the first optical label excited by the excitation light passing through the first passband, the excitation light being radiated in step (b).

The bandpass filter of the detection module includes the third passband and the fourth passband. According to an implementation the present disclosure, the third passband may include the wavelength range of emission light emitted by the optical label that may be excited by the excitation light passing through the first passband, while the fourth passband may include the wavelength range of emission light emitted by the optical label that may be excited by the excitation light passing through the second passband. Specifically, the third passband may include the entirety or a portion of the wavelength range of emission light emitted by the optical label that may be excited by excitation light passing through the first passband, while the fourth passband may include the entirety or a portion of the wavelength range of emission light emitted by the optical label that may be excited by excitation light passing through the second passband.

Accordingly, the emission light emitted by the first optical label of the sample may pass through the multi bandpass filter of the detection module and be detected by the detector.

Each of the third passband and the fourth passband may include the wavelength range of emission light emitted by a specific optical label. Specific types of the optical label are as described hereinbefore. In particular, the optical label may be an optical label selected from the group consisting of, but not limited to, FAM, CAL Fluor Red 610, HEX, Quasar 670, and Quasar 705.

The fourth passband included in the single multi bandpass filter including the third passband and the fourth passband according to the present disclosure is required to have a structure that prevents emission light of an optical label that emits light passing through the third passband, from among the optical labels included in the sample, from passing through the fourth passband. In this regard, the wavelength range of the third passband and the wavelength range of the fourth passband may be spaced apart from each other. Specifically, the central wavelength of the third passband and the central wavelength of the fourth passband may be spaced apart from each other by a predetermined magnitude. According to an implementation the present disclosure, the central wavelength of the third passband and the central wavelength of the fourth passband may be spaced apart from each other by at least 10 nm, 20 nm, 30 nm, 40 nm, 50 nm, 60 nm, or 70 nm. According to an implementation the present disclosure, the central wavelength of the third passband and the central wavelength of the fourth passband may be spaced apart from each other by a range of from 10 nm to 500 nm, 20 nm to 400 nm, 30 nm to 300 nm, 30 nm to 200 nm, 50 nm to 200 nm, 60 nm to 200 nm, or 70 nm to 200 nm.

The detector detects the emission light, i.e. the signal emitted by the first optical label, and detects the target analyte within the same in accordance with the emission light. The detector is configured to be able to the emission light i.e. the signal emitted by the first optical label included in the sample. The detector may be configured to detect wavelength-specific light intensities by discriminating the wavelength of light or detect a total intensity of light regardless of the wavelength. Specifically, the detector may be implemented as, for example, a photodiode, a photodiode array, a photomultiplier tube, a CCD image sensor, a CMOS image sensor, or an avalanche photodiode.

In step (d), the excitation light of the second wavelength range is generated from the multi-wavelength light source area and is radiated to the samples through the multi bandpass filter of the light module.

The multi-wavelength light source unit stops the excitation light generation of the first light source element, and applies power to the second light source element to generate the excitation light of the second wavelength range. The excitation light is radiated to the sample through the multi bandpass filter of the light module. The excitation light of the second wavelength range excites the second optical label included in the sample, depending on the presence or amount of the target analyte in the sample. The second optical label is an optical label that may be excited by excitation light passing through the second passband.

In step (e), the signals emitted from the samples are detected by the detector through the multi bandpass filter of the detection module.

The emission light, i.e. a signal emitted by the sample in step (e), is light emitted by the second optical label excited by excitation light passing through the second passband, the excitation light being radiated in step (d).

As described above in step (c), the bandpass filter of the detection module includes the fourth passband including the wavelength range of emission light emitted by the optical label, the emission light being excitable by excitation light passing through the second passband, so that the emission light emitted by the second optical label of the sample may pass through the bandpass filter of the detection module and be detected by the detector.

The target analyte within the sample is detected by detecting the emission light, i.e. a signal emitted by the second optical label. The signal emitted by the second optical label is different from the signal emitted by the first optical label. As described above, according to the method according to the present disclosure, a plurality of signals emitted by the sample may be detected.

Such signals indicate the presence of the target analyte. The target analyte may be a target nucleic acid. The target analyte detected by the first optical label may differ from the target analyte detected by the second optical label. As described above, according to the method according to the present disclosure, a plurality of target analytes in the sample may be detected using a combination of the single light source unit and the bandpass filter.

In addition, the light module may further comprise the multi-wavelength light source area and the multi bandpass filter. The light module may further comprise one or more light source areas and filters corresponding to the light source areas. The light source area and the filter additionally included as above may be a single-wavelength light source area and a single bandpass filter or a multi-wavelength light source area and a multi bandpass filter. Accordingly, the method according to the present disclosure may further include a step of detecting signals using the added light source area and the added filter. As described in Section I, the added light source area may be a multi-wavelength light source area or a single-wavelength light source area, while each of the added bandpass filter of the light module and the added bandpass filter of the detection module may be a multi bandpass filter or a single bandpass filter.

According to an implementation the present disclosure, the method according to the present disclosure may further comprise a detection step using the single bandpass filter, the detection step including the following steps of:

generating excitation light from the single-wavelength light source area and radiating the excitation light to the sample through the single bandpass filter of the light module; and detecting emission light emitted by the sample through the single bandpass filter of the detection module.

Due to the addition of these steps, the method according to the present disclosure may detect additional signals from the same sample.

According to another implementation of the present disclosure, the method according to the present disclosure may further comprise a detection step using the multi bandpass filter, the detection step comprises the following steps of:

generating excitation light from the multi-wavelength light source area and radiating the excitation light to the sample through the multi bandpass filter of the light module; detecting emission light emitted from the sample by the detector through the multi bandpass filter of the detection module; and repeating the two steps.

The number of repeating the two steps may be determined by the number of different wavelength ranges of excitation light that may be generated by the added multi-wavelength light source area and the added multi bandpass filter.

Due to the addition of the steps, the method according to the present disclosure may detect two or more additional signals from the same sample.

The detection means an operation of determining the presence of the target analyte or an operating of detecting the presence or intensity of a signal generated by the target analyte so that an initial amount of the target analyte may be determined. Specifically, the presence or intensity of emission light, i.e. a signal generated by each target-specific optical label, is detected by the detector, and the presence or initial amount of the target analyte is determined in accordance with information regarding the presence or intensity of the emission light. The target analyte may be a target nucleic acid. The detection may be performed, for example, by amplifying the target nucleic acid. Afterwards, according to method according to the present disclosure, the intensity of the emission light emitted by the optical label corresponding to each target may be detected and measured by the light detector. As an alternative, during the amplification of the target nucleic acid, the intensity of the emission light emitted by the optical label corresponding to each target may be detected and measured in every cycle by the method according to the present disclosure.

Since the components of the signal detection device are substantially the same as the components of the signal detection device 10 as described above, detailed descriptions thereof will be omitted to avoid unnecessary repetition.

It will be understood that the terms "comprise", "include", "have", and any variations thereof used herein are intended to cover non-exclusive inclusions unless explicitly described to the contrary. Unless otherwise specified, all terms including technical and scientific terms used herein have the same meaning as that commonly understood by those having ordinary knowledge in the technical field to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The foregoing detailed descriptions of specific exemplary embodiments of the present disclosure have been and are not intended to be exhaustive or to limit the present disclosure to the precise forms disclosed, and obviously a number of modifications and variations are possible for those having ordinary knowledge in the art in light of the above teachings. It is intended therefore that the scope of the present disclosure not be limited to the foregoing embodiments, but be defined by the Claims appended hereto and their equivalents.

The invention claimed is:

1. A device for detecting signals emitted by samples, comprising:
a light module;
a sample holder accommodating a plurality of reaction vessels, the sample holder divided into a plurality of sample areas comprising a first area and a second area, wherein the first area and the second area are different sample areas, each area disposed in a distinct location; and
a detection module comprising a plurality of detectors for detecting signals emitted from the samples included in the reaction vessels in the sample holder,
wherein the light module comprises:
a plurality of light sources emitting light to excite the samples;
a light source wheel accommodating the plurality of light sources, the light source wheel divided into a plurality of light source areas where one or more light sources are disposed in each thereof;
a plurality of filters filtering light emitted by the light sources;
a filter wheel accommodating the plurality of filters,
wherein the light source wheel and the filter wheel are fixed to each other, and
wherein the light emitted by the light sources is configured to be filtered by the plurality of filters before exciting the samples; and
a motor rotating the light source wheel and the filter wheel,
wherein the plurality of light source areas are located to radiate light to a predetermined area of the sample holder,
wherein the plurality of detectors comprises a first detector and a second detector,
wherein the first detector and the second detector are different detectors that are disposed in distinct locations,
wherein when emission light is emitted in response to excitation light radiated simultaneously to the plurality of reaction vessels in the first area of the sample holder, the first detector detects the emission light emitted from the first area, and wherein when emission light is emitted in response to excitation light radiated simultaneously to the plurality of reaction vessels in the second area of the sample holder, the second detector detects the emission light emitted by the second area.

2. The device according to claim 1, wherein the detection module comprises a multi bandpass filter including a third passband and a fourth passband,
wherein the multi bandpass filter is configured such that the signals emitted from the samples are radiated to the plurality of detectors through the multi bandpass filter of the detection module.

3. The device according to claim 2, wherein the third passband of the multi bandpass filter of the detection module includes a wavelength range of emission light emitted by an optical label excitable by excitation light passing through a first passband of a multi bandpass filter of the light module, and the fourth passband of the multi bandpass filter of the detection module includes a wavelength range of emission light emitted by an optical label excitable by excitation light passing through a second passband of the multi bandpass filter of the light module.

4. The device according to claim 1, wherein the light sources disposed in two or more light source areas from among the plurality of light source areas emit light of different wavelengths.

5. The device according to claim 1, wherein the light sources disposed in different light source areas emit light of different wavelengths.

6. The device according to claim 1, wherein positions of the plurality of light source areas are synchronizedly changed by rotation of the light source wheel.

7. The device according to claim 1, wherein the light source areas comprise a first light source area and a second light source area, two or more first light sources emitting light of a first wavelength are disposed in the first light source area, and two or more second light sources emitting light of a second wavelength are disposed in the second light source area.

8. The device according to claim 1, wherein the filter wheel is divided into a plurality of filter areas, and one or more filters are disposed in each of the filter areas.

9. The device according to claim 8, wherein positions of the plurality of filter areas are synchronizedly changed by rotation of the filter wheel.

10. The device according to claim 8, the filter areas are aligned so as to be located on a path of light emitted by the light source areas.

11. The device according to claim 10, wherein the light source wheel and the filter wheel rotate so that the alignment of the light source areas and the filter areas is maintained.

12. The device according to claim 1, wherein the light source wheel and the filter wheel are disposed in parallel to each other.

13. The device according to claim 1, wherein the light source wheel and the filter wheel are configured to rotate together in response to rotation of the motor.

14. The device according to claim 8, wherein the light source disposed in a first light source area from among the plurality of light source areas emits light of a first wavelength range, the light source disposed in a second light source area from among the plurality of light source areas emits light of a second wavelength range, the filter disposed in a first filter area from among the plurality of filter areas allows the light in the first wavelength range to pass therethrough, the filter disposed in a second filter area from among the plurality of filter areas allows the light in the second wavelength range to pass therethrough, the first light source area and the first filter area are located on a first path of light, and the second light source area and the second filter area are located on a second path of light.

15. The device according to claim 1, wherein the light source wheel comprises n number of light source areas, the filter wheel comprises n number of filter areas, and the light source wheel and the filter wheel are rotated 360°/n in a single time by the motor, where the n is a natural number equal to or greater than 2.

16. The device according to claim 1, wherein at least one light source area from among the plurality of light source areas is a multi-wavelength light source area in which a first light source and a second light source are disposed, wherein the first light source emits light of a first wavelength range, and the second light source emits light of a second wavelength range different from the first wavelength range.

17. The device according to claim 16, wherein the first light source and the second light source are arrayed regularly in a single light source area of the light source wheel.

18. The device according to claim 16, wherein the plurality of light source areas comprise a single-wavelength light source area and a multi-wavelength light source area.

19. The device according to claim 8, wherein at least one filter area from among the plurality of filter areas comprises a multi bandpass filter including a first passband and a second passband.

20. The device according to claim 19, wherein the first passband and the second passband do not overlap each other.

* * * * *